United States Patent
Tiberghien et al.

(10) Patent No.: US 11,988,314 B2
(45) Date of Patent: May 21, 2024

(54) MALE ELEMENT OF A FLUIDIC COUPLING, FLUIDIC COUPLING COMPRISING SUCH A MALE ELEMENT AND METHOD FOR ASSEMBLING SUCH A MALE ELEMENT

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Frederic Morel, Lathuile (FR)

(73) Assignee: STAUBLI FAVERGES, Faverges-Seythenex (FR)

(*) Notice: Subject to any disclaimer, the term of this patent is extended or adjusted under 35 U.S.C. 154(b) by 166 days.

(21) Appl. No.: 17/626,547

(22) PCT Filed: Jul. 24, 2020

(86) PCT No.: PCT/EP2020/070926
§ 371 (c)(1),
(2) Date: Jan. 12, 2022

(87) PCT Pub. No.: WO2021/018759
PCT Pub. Date: Feb. 4, 2021

(65) Prior Publication Data
US 2022/0243851 A1  Aug. 4, 2022

(30) Foreign Application Priority Data

Jul. 26, 2019 (FR) ...................................... 1908526

(51) Int. Cl.
*F16L 37/23* (2006.01)
*F16L 37/40* (2006.01)

(52) U.S. Cl.
CPC ............... *F16L 37/23* (2013.01); *F16L 37/40* (2013.01)

(58) Field of Classification Search
CPC .................................. F16L 37/23; F16L 37/40
See application file for complete search history.

(56) References Cited

U.S. PATENT DOCUMENTS

| 2,461,700 | A | * | 2/1949 | Scheiwer | ................ | F16L 37/23 |
| | | | | | | 137/614.03 |
| 2023/0030360 | A1 | * | 2/2023 | Durieux | ................... | F16L 37/23 |

FOREIGN PATENT DOCUMENTS

| CN | 103939695 B | 3/2016 |
| CN | 208138665 U | 11/2018 |
| GB | 2445701 A | 7/2008 |

OTHER PUBLICATIONS

France Search Report for France Application No. 1908526 dated May 13, 2020, 2 pages.

(Continued)

*Primary Examiner* — David Bochna

(57) ABSTRACT

A male element of a fluidic coupling intended to be coupled with a female element. The male element includes a ring, defining an annular space and in which ring radial housings are formed. Locking balls are received in the radial housings and are able to move radially between an inward position and an outward position. The balls are retained within their respective radial housings by narrowings having inner and outer projections provided where each respective radial housing meets the inner and outer faces of the ring. The ring has a first part and a second annular part, which parts are secured to one another. Longitudinal slots are provided in one of either the first or second parts of the ring.

19 Claims, 17 Drawing Sheets

(56) References Cited

OTHER PUBLICATIONS

International Search Report for International Application No. PCT/EP2020/070926 dated Sep. 23, 2020, 2 pages.

* cited by examiner

MALE ELEMENT OF A FLUIDIC COUPLING, FLUIDIC COUPLING COMPRISING SUCH A MALE ELEMENT AND METHOD FOR ASSEMBLING SUCH A MALE ELEMENT

CROSS-REFERENCE TO RELATED APPLICATIONS

This application is a national stage entry of international patent application no. PCT/EP2020/070926, filed on Jul. 24, 2020, which claims priority to French patent application no. FR1908526, filed on Jul. 26, 2019.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIALS SUBMITTED ON A READ-ONLY OPTICAL DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

BACKGROUND OF THE INVENTION

The present invention relates to a male element of a fluidic coupling which, together with a female element, makes it possible to make a fluidic coupling that makes the removable joining of pipes possible.

The invention more particularly related to quick connectors having an automatic locking mechanism when the male element and the female element of the connector are coupled.

It is known from CN-U-208138665 to provide a so-called "quick coupling" comprising a male and a female coupling element. The male element comprises a body that includes a tubular cylindrical extension extending along the insertion axis and forming an inner fluid passage. The male element also includes a ring integral with the body extending along the insertion axis and surrounds the tubular cylindrical extension. This ring defines an annular space between the tubular cylindrical extension and its inner surface. Radial housings that receive radially movable locking balls are drilled into the ring. Plastic deformation of the material is then performed at the inner and outer ends of each radial recess to form local narrowings of the radial recess. The female coupling element has a tubular body that extends along the insertion axis and forms an inner fluid passage. This tubular body is provided with a distal end that penetrates the annular space between the tubular cylindrical extension and the inner surface of the ring during coupling and has an outer annular slot to receive the locking balls. The radial housings containing the locking balls are constricted at the inner and outer ends to form stops, so that the locking balls are radially movable but held within the radial housings.

The annular space and radial housings are obtained by machining. The coolants contain aggressive media, which require the use of particularly hard and not very ductile stainless-steel materials for the construction of the coupling elements. These materials generate high machining forces during the production of these connecting elements, which make the machining imprecise.

The invention intends to remedy these problems in particular by proposing a male fluidic coupling element whose ring and radial housings receiving locking balls are easy to manufacture.

BRIEF SUMMARY OF THE INVENTION

To this end, the invention relates to a male fluidic coupling element intended to be coupled with a female element. The male element comprises a hollow body, which extends along a longitudinal axis and which has a distal cylindrical extension. The male element also comprises a ring, axially integral with the body, surrounding the cylindrical extension and having an inner face and an outer face, the inner face of the ring defining an annular space with the cylindrical extension. Radial housings are provided in the ring. The male element further comprises locking balls, which are housed in the radial housings and which are radially movable between an inner position, in which the balls partially emerge from the inner face of the ring, and an outer position, in which the balls do not emerge from the inner face of the ring, the balls being retained radially within their respective radial housings by narrowings consisting of inner and outer projections, provided at the junction of each respective radial housing and the inner and outer faces of the ring. According to the invention, the ring is formed by the assembly of a first and second part, the first and second parts being integral with each other along the longitudinal axis, the first part is axially integral with a distal bearing surface orthogonal to the longitudinal axis, while the second part is annular and comprises a proximal bearing surface, the proximal and distal bearing surfaces being in longitudinal contact with each other. Longitudinal slots are provided in one of the first or second parts of the ring, the longitudinal slots each having a first wall and opening axially onto a mouth surface of this part of the ring, the mouth surface being at least partially opposite a surface of the other of the first or second parts of the ring along the longitudinal axis, while the other of the first or second parts of the ring has second walls opposite each longitudinal slot along the longitudinal axis. Each radial housing is delimited by the first wall of the longitudinal slot and the second wall facing it. At least one of the first or second walls has the outer projection or at least one of the outer projections located at the junction of the walls of each radial housing with the outer face of the ring, while at least one of the first or second walls has the inner projection or at least one of the inner projections located at the junction of the walls of each radial housing with the inner face of the ring. The inner and outer protrusions extend into each radial housing and form the radial retaining clamps for the locking balls in the radial housing.

Thanks to the invention, the ring comprising the radial housings is made in two parts, which are easy to machine separately from each other, the interior of the radial housings being directly accessible, which facilitates in particular the manufacture of the radial housing clamps. Thanks to the invention, the radial housings can be machined in various ways, depending on the materials of the coupling and/or the available tooling.

According to advantageous but non-mandatory aspects of the invention, such a male element may incorporate one or more of the following features, taken in any technically permissible combination:

Longitudinal slots are provided in the second part.

Each second wall is arranged in an intermediate longitudinal region of the longitudinal slot.

The longitudinal slots are provided in one of the first or second parts, the proximal or distal bearing surface of the other of the first or second parts forming the second wall of each radial housing.

The first part is integral with the cylindrical extension.

The inner and outer projections are provided in only one of the first part and the second part.

The inner and outer projections are arranged at the junction of the first wall with the inner and outer faces of the ring.

The second part comprises a guiding skirt, which radially interacts with the first part to provide radial centering of the second part relative to the first part.

The guiding skirt comprises the proximal bearing surface, which is provided on a rear end of the guiding skirt.

the mouth surface is the bearing surface of whichever of the first or second parts includes the longitudinal slots.

The longitudinal slots are oblong slots provided in the second part and comprise a distal part and a proximal part, while the proximal part of each longitudinal slot has a diameter, at its junction with the outer radial surface of the second part and/or at its junction with the inner radial surface of the second part, larger than the diameter of the locking balls and the inner and outer projections are formed on the distal part of each longitudinal slot.

The second part comprises a wall that extends axially to the rear from the proximal bearing surface, the wall being plastically deformable over a shoulder of the first part so as to axially secure the first part and the second part.

The first part and the second part are connected by welding, preferably by laser welding.

Each longitudinal slot is delimited along the longitudinal axis by a bottom formed by a part of cylinder defining an inner diameter, while, the axial distance for each radial housing, between the second wall and the bottom of each longitudinal slot, is equal to the inner diameter of the part of cylinder of the bottom.

The invention also relates to a fluid coupling comprising a male element as mentioned above and a female element, adapted to be fitted together in the longitudinal direction, the female element comprising a distal end in which an outer annular slot is provided, and a locking ring which has a locking face, the locking ring being adapted to move from a locking position, in which the locking face is radially aligned with the outer annular slot and holds the locking balls in an inward position, and an unlocking position, in which the locking face is offset from the outer annular slot along the longitudinal axis, each ball being free to move to an outward position within the radial housing, in a coupled configuration of the male and female element, the distal end being received within the annular space of the male element and the locking balls being received within the outer annular slot.

This coupling has the same advantages as the male element of the invention.

The invention also relates to a method for assembling a male element of a fluid coupling as described above, the assembly method comprising at least successive steps of:

(a) inserting the locking balls into the longitudinal slots provided in one of the first or second parts of the ring, b) engaging the first part with the second part of the ring, with a second wall facing each longitudinal slot along the longitudinal axis, while the inner and outer projections are already present c) bringing the distal bearing surface into contact with the proximal bearing surface along the longitudinal axis, d) axially securing the first and second parts of the ring to each other.

Thanks to the method of the invention, assembly of the male element is easy and compatible with various materials.

Advantageously, in step d), the first and second parts are connected to each other by welding, preferably by laser welding, or gluing.

BRIEF DESCRIPTION OF THE SEVERAL VIEW OF THE DRAWINGS

The invention will be better understood and other advantages thereof will become clearer in the light of the following description of six embodiments of a male element, a quick fluid coupling and an assembly method according to the principle thereof, given by way of example only and made with reference to the drawings, in which.

DETAILED DESCRIPTION OF THE INVENTION

Figure 1:
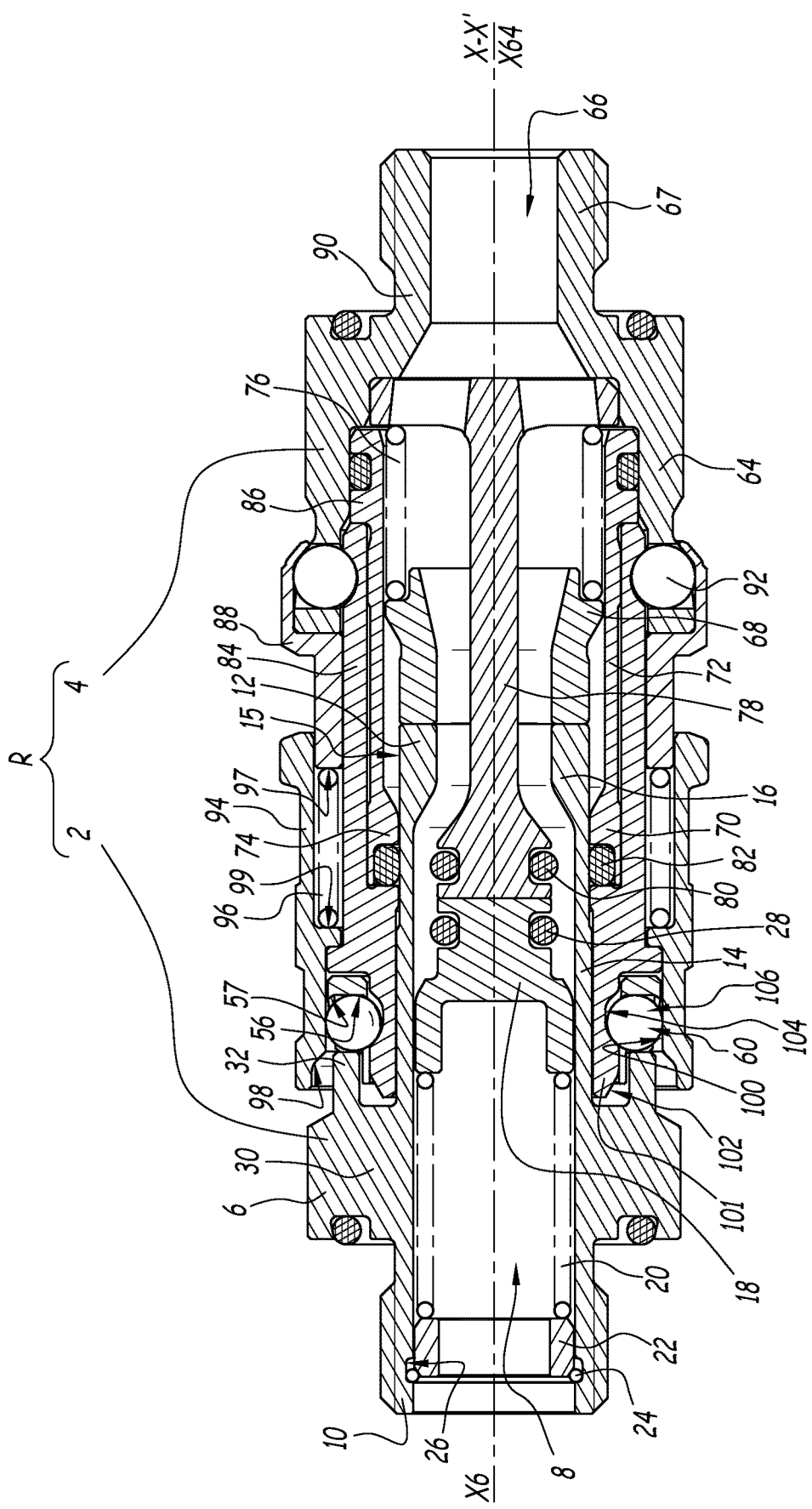
FIG. 1 is a cross-section of a quick coupling according to the invention, comprising a male element according to a first embodiment of the invention and a female element, the quick coupling being in a paired configuration.

FIG. 1 shows a fluidic type if coupling R.

The coupling R comprises a male element 2 according to a first embodiment of the invention and a female element 4. The male element 2 is complementary to the female element 4. In the configuration of FIG. 1, the male element 2 and the female element 4 are connected to each other, i.e. the male element 2 is pressed into the female element 4, and the coupling R defines a longitudinal press-in axis X X'.

In this regard, a longitudinal or axial direction of a coupling element is defined as extending along the longitudinal centerline of the element, i.e. horizontal in FIG. 1. A radial direction to an axis is defined as orthogonal to that axis; a radial plane to an axis is defined as a plane containing that axis and extending in a radial direction; an orthoradial plane to an axis is a plane orthogonal to a radial plane to that axis and not intersecting that axis; and an orthoradial direction to an axis is a direction orthogonal to a radial plane to that axis and not intersecting that axis. A direction orthoradial to an axis is defined as being oriented in a direction corresponding to a rotation about that axis. For each element under consideration, "inner" means "facing the central longitudinal axis", while "outer" means "facing away from the central longitudinal axis".

For more clarity, the front or distal side of a male or female element is also defined as the side of this male or female element that is oriented in the longitudinal direction in the insertion or coupling direction, i.e. facing the female or male element at the beginning of the insertion process. The front side of the male element 2 is oriented to the right of FIG. 1, while the front side of the female element 4 is oriented to the left of FIG. 1. Conversely, the rear or proximal side of a respective male or female element is defined as the longitudinal direction opposite to the respective female or male element.

In the following, a part is considered to be integral with another part along a given direction when the two parts have no possibility of relative movement along that direction.

The male element 2 comprises a body 6. The body 6 of the male element 2 is made of metal. Several types of metal can be used. depending on the application, the fluid being conveyed and the operating pressure. As a non-limiting example, when the fluid passing through the coupling R, such as a cooling fluid, is corrosive, the body 6 can be made of stainless steel. In other applications, the body 6 may be made partially or completely of brass. The body 6 can be manufactured by machining, especially by turning.

The body 6 is hollow, extends along a longitudinal axis X6, and has a through interior passage 8. The longitudinal axis X6 coincides with the insertion axis X-X' of the coupling R when the male 2 and female 4 elements are inserted. The body 6 has a proximal end 10 and a distal end 12.

Figure 3:
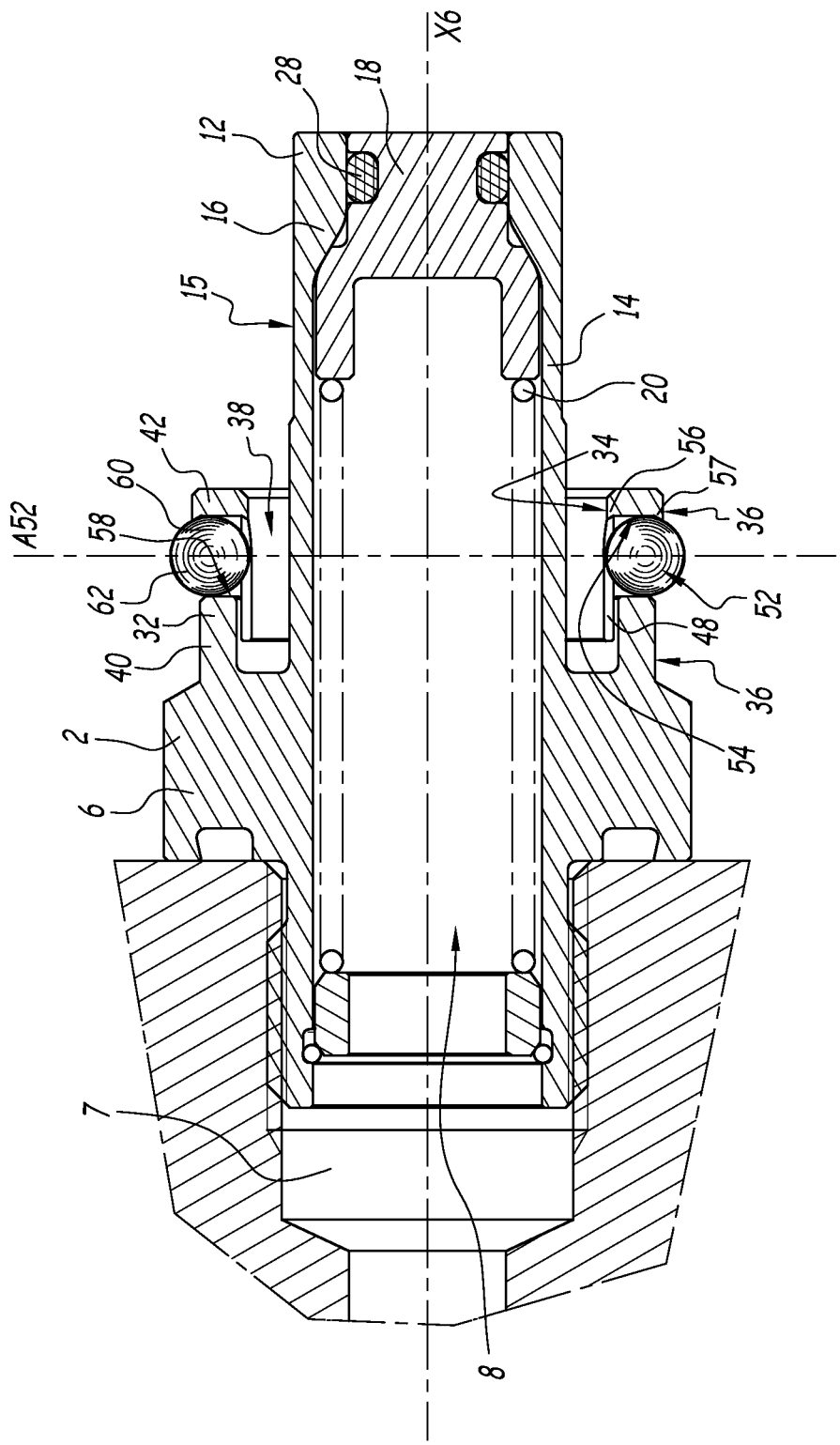
FIG. 3 is a cross-section of the male element of FIG. 2 along a sectional plane III of FIG. 2.

At the proximal end 10, the outside of the body 6 is threaded so that it can be connected to a pipe 7, shown only in FIG. 3. On the side of the distal end 12, the inner passage 8 is housed in a distal cylindrical extension 14 of the body 6. The cylindrical extension 14 is circular in cross-section and has an outer radial surface 15 and a distal inner bulge 16, which forms n stop for a valve 18 movable within the inner passage 8. The valve 18 is pushed forward from the body 6 by a coil spring 20. The spring 20 rests proximally on a stop ring 22, the stop ring 22 being stopped by a flexible snap ring 24 housed in a slot 26 of the inner passage 8.

The body 6 also comprises an outer collar 30, which extends from the remainder of the body 6 radially to the longitudinal axis X6, away from it. In the example shown in the figures, the outer collar 30 is hexagonal, which facilitates the mounting of the male element 2 on the pipe 7 by means of a wrench. On the distal side, the outer flange 30 is extended by a cylindrical ring 32 with a circular cross-section, centered on the longitudinal axis X6. The ring 32 surrounds the cylindrical extension 14 and has an inner face 34, oriented towards the longitudinal axis X6, and an outer face 36, oriented away from the inner face 34. The front face of the ring is recessed to the rear of the male element 2 relative to the distal inner bulge 16. The ring 32 along with the cylindrical extension 14 define an annular space 38, provided radially between the outer radial surface 15 of the cylindrical extension 14 and the inner face 34.

The ring 32 comprises a first part 40, axially integral with the outer collar 30, and a second part 42. The first part 40 and the second part 42 are two separate pieces that are assembled to form the ring 32, as will be apparent from the following description. The first part 40 takes the form of a hollow cylinder, centered on the longitudinal axis X6, which is connected at a rear end to the outer collar 30 and which has a distal surface 44 at the opposite end. The distal surface 44 is orthogonal to the longitudinal axis X6. The first part 40 has an inner diameter D40.

The second part 42 here has an annular ring shape, centered on the longitudinal axis X6. On the proximal side, the second part 42 has a proximal surface 46. The proximal surface 46 and distal surface 44 face each other along the longitudinal axis X6, with the proximal surface 46 being parallel to the distal surface 44 of the first part 40 of the ring 32 in the assembled configuration of the first and second parts 40 and 42. In the first mode, the distal surface 44 and proximal surface 46 are in longitudinal contact with each other. Thus, the distal surface 44 is a distal bearing surface, while the proximal surface 46 is a proximal bearing surface.

The second part 42 also comprises a skirt 48, which is a cylindrical wall with a circular cross-section centered on the longitudinal axis X6 and extends to the rear from the proximal surface 46, parallel to the longitudinal axis X6. The skirt 48 has an outer surface 50 with an outer diameter D50. The skirt 48 interacts radially with the first part 40 to provide radial centering of the second part 42 relative to the first part 40. The skirt 48 is thus a guiding skirt. In the first embodiment, the skirt 48 extends axially within the annular space 38 in contact with an inner radial surface 35 of the first part 40. In other words, the outer diameter D50 is equal to the inner diameter D40 within the assembly clearance. The skirt 48 is configured to ensure the centering of the second part 42 in relation to the first part 40 of the ring 32 radially to the longitudinal axis X6, while the distal 44 and proximal 46 surfaces, resting on each other, ensure the longitudinal positioning of the second part 42 in relation to the first part 40, in relation to the longitudinal axis X6.

It is understood that the first part 40 is integral with the body 6, while the second part 42 is attached to the body 6, the ring 32 being formed by joining the first part 40 and the second part 42. The first part 40 and the body 6 are axially integral. In the example shown in the Figures, the first part 40 and the body 6 constitute a one-piece part. In particular, the first part 40 is integral with the cylindrical extension 14. According to a variant not shown, the first part 40 is attached to the body 6, by screwing, for example.

Figure 2:
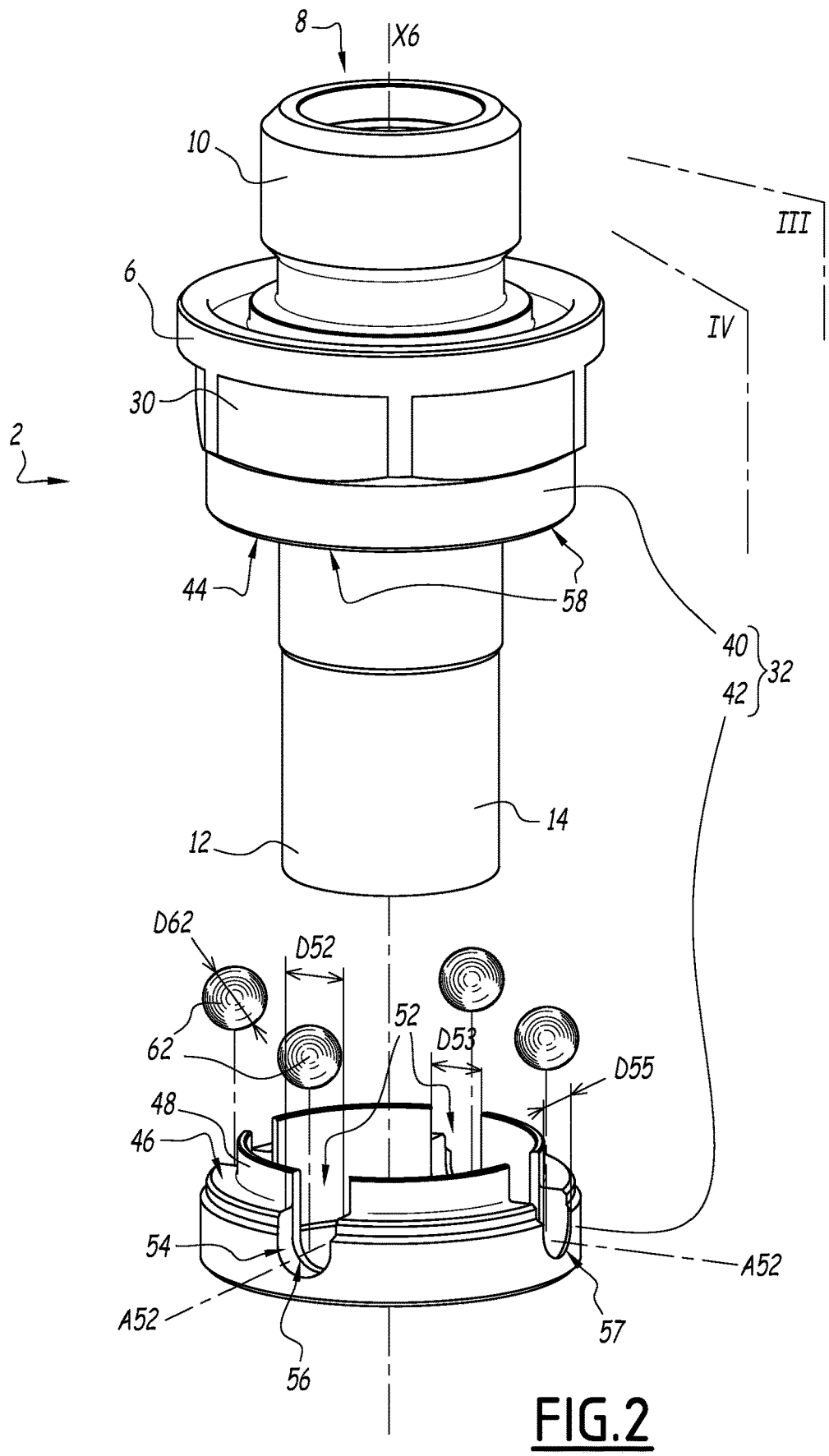
FIG. 2 is an exploded perspective view of certain components of the male element of the coupling of FIG. 1.

The second part 42 further comprises slots 52 which are longitudinal, in that their largest dimension is understood to be parallel to the axis X6. In the first embodiment shown in FIGS. 1 to 4, the longitudinal slots 52 are notches, four in number, which are evenly distributed around the longitudinal axis X6 at the periphery of the second part 42 and which each have a first inner U-shaped wall 54. The longitudinal slots 52 extend axially from the proximal surface 46 toward the front of the second part 42, while the bottom of the U is provided forward of the proximal surface 46. The bottom of the U comprises a cylinder part having an axis A52 radial to the longitudinal axis X6 and having an inner diameter D52. The longitudinal slots 52 open axially on the proximal surface 46 to the rear. In other words, there is an intersection between the first wall 54 and the proximal surface 46. This intersection is transverse to the longitudinal axis X6. The proximal surface 46 is thus also a mouth surface of the second part 42 with longitudinal slots 52. As can be seen in FIG. 2, the proximal surface 46 is formed by joining several surface parts distributed around the longitudinal axis X6 and delimited by the slots 52. This proximal surface 46 faces a surface of the first part 40 along the longitudinal axis X6. In other words, the proximal surface 46 and the first part 40 face each other and are aligned along an axis parallel to the longitudinal axis X6. In the illustrated example, the proximal surface 46 faces the distal surface 44 along the longitudinal axis X6.

At the junction between each first wall 54 and the inner 34 and outer 36 faces of the second part 42, each of the longitudinal slots 52 has an inner projection 56 and an outer projection 57, or inner and outer edges, each of which extends into each longitudinal slot 52 without protruding from the inner 34, respectively outer 36 face. For each longitudinal slot 52, the inner 56 and outer 57 projections face each other in a direction radial to the longitudinal axis X6.

Figure 6:
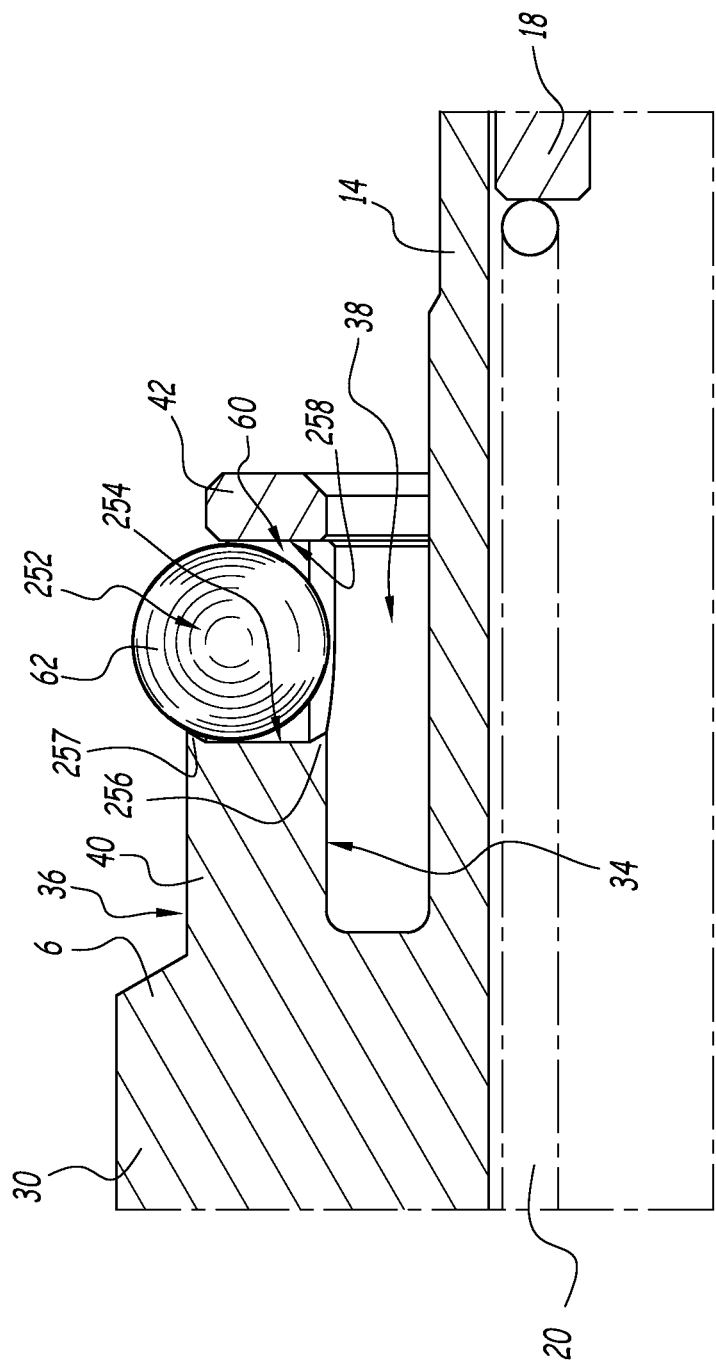
FIG. 6 is a cross-section of a detail of the male element of FIG. 5 along a plane VI of FIG. 5.
Figure 8:
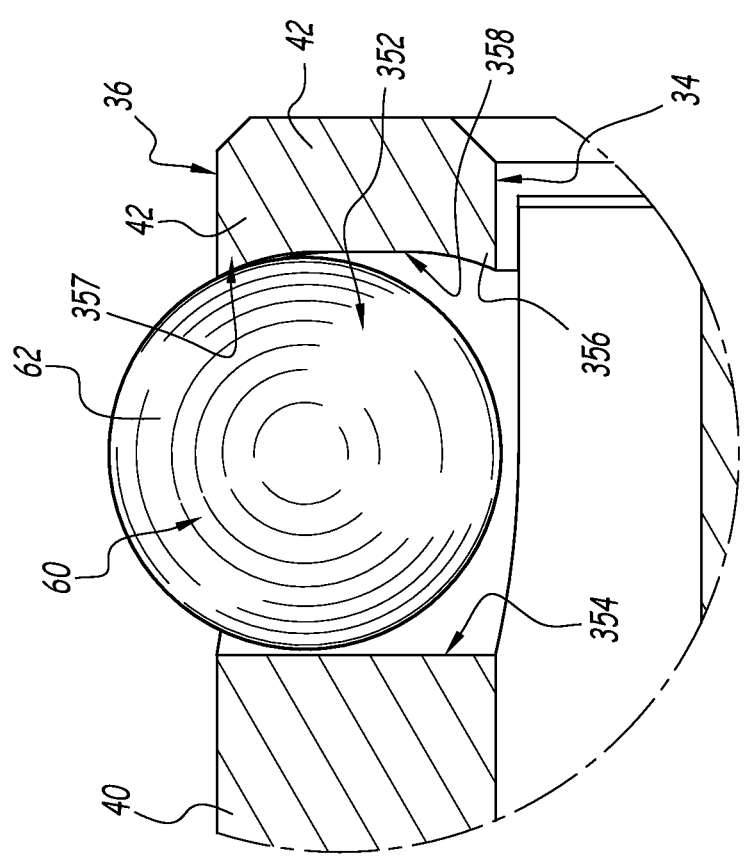
FIG. 8 is a cross-section of a detail of the male element of FIG. 7 along the cutting plane VIII of FIG. 7.

The inner and outer projections 56 and 57 shown on a relatively large scale in FIGS. 1 to 3 are also visible with references 256, 257, 356 and 357 and on a smaller scale in FIGS. 6 and 8 relating to other embodiments of the male element 2 but in which the projections have the same structure as in the first embodiment.

A second wall 58 is defined as each part of the distal surface 44 located opposite a longitudinal slot 52 along the longitudinal axis X6. In the example of FIGS. 1 to 4, there are thus four second walls 58.

For each longitudinal slot 52, a radial housing 60 is defined as a volume delimited by the first wall 54 of this longitudinal slot 52 on the distal side and by the second wall 58 located opposite on the proximal side. Each radial housing 60 is also delimited by the inner face 34 of the ring 32 on the inner side and by the outer face 36 of the ring 32 on the outer side.

For each radial housing 60 and for the inner face 34, an inner passage diameter D53 is defined as the smallest dimension between two points diametrically opposed in relation to the axis A52, one of the points belonging to the first wall 54, at the level of one of the inner projections 56 located at the level of this inner face 34, and the other point belonging to the second wall 58 opposite or to another part of the first wall 54.

Similarly, for each radial housing 60 and for the outer face 36, an outer passage diameter D55 is defined as the smallest dimension between two points diametrically opposed in relation to the axis A52, one of the points belonging to the first wall 54, at the level of one of the outer projections 57 located at the level of this outer face 36, and the other point belonging to the second wall 58 facing or to another part of the first wall 54.

The inner and outer passage diameters D53 and D55 are preferably identical.

For each radial housing 60, the inner and outer passage diameters D53 and D55 measured at the inner 34 or outer 36 faces are smaller than the inner diameter D52. In other words, the longitudinal slots 52 are tighter at their junction with the inner face 34 and at their junction with the outer face 36 than at the cylinder part of axis A52, this cylinder part being arranged between the inner 56 and outer 57 projections of the radial housing 60 in a direction radial to the longitudinal axis X6.

The inner 56 and outer 57 projections extend into the interior of the radial housing 60.

For each radial housing 60, the axial distance between the second wall 58 and the bottom of the longitudinal slot 52 is equal to the diameter D52. The axial distance is understood as the maximum distance between the second wall 58 and the bottom of the slot 52.

For each longitudinal slot 52, the passage diameters D53 and D55 are smaller than the inner diameter D52; in other words, the inner 56 and outer 57 projections form narrowings of each radial housing 60 at the level of the inner 34 and outer 36 faces of the ring 32.

The male element 2 further comprises locking balls 62, which are made of metal, preferably stainless steel, and which each have a diameter D62. One ball 62 is housed in each of the radial housings 60.

The diameter D62 of the balls is smaller than the inner diameter D52 of the longitudinal slots 52. Thus, the locking ball 62 has substantially as much clearance with its radial recess 60 in the longitudinal direction as in the orthoradial direction, and the second wall 58 guides the radial movement of the locking ball 62 between the outer and inner positions.

In contrast, the diameter D62 of the balls 62 is strictly larger than the inner D53 and outer D55 passage diameters of each radial housing 60. The balls 62 are thus retained within their respective radial housings 60 in a radial direction to the longitudinal axis X6.

In other words, a ball 62 is retained within its respective radial housing 60 by the narrowings, which are composed of the inner 56 and outer 57 projections provided at the junction of this radial housing and the inner 34 and outer 36 surfaces of the ring 30. The passage diameters D53 and D55 and the radial height of the cylinder part of the longitudinal slot 52 are dimensioned such that the balls 62 are radially movable within their respective radial housings 60 and that the balls 62 emerge from the inner 34 or outer 36 faces during their radial translational movements the longitudinal axis X6 within the radial housings 60. The balls 62 are movable between an outer position and an inner position, the outer position being further radially from the longitudinal axis X6 than the inner position. In the outer position, the balls 62 partially emerge from the outer face 36 of the ring 32 but do not emerge from the inner face 34. In the inner position, the balls 62 partially emerge from the inner face 34 of the ring 32, but do not emerge from the outer face 36 of the ring 32.

The female element 4, visible in FIG. 1, is now described.

The female element 4 comprises a body 64, which extends along a longitudinal axis X64 that is coincident with axes X-X' and X6 in the configuration of FIG. 1. The body 64 of the female element 4 is made of metal, such as stainless steel or brass.

The body 64 is hollow, has rotational symmetry about the longitudinal axis X64, and defines a through interior passage 66, the distal end of which is configured to receive the cylindrical extension 14 of the male element 2.

The body 64 has a proximal end 67 and a distal end 70. For the proximal end 67, the exterior of the body 64 is threaded so that it can be assembled to a pipe, not shown.

For the distal end 70, the inner passage 66 is received within a cylindrical extension 72 of the body 64. The cylindrical extension 72 has an inner bulge 74 that forms a stop for an annular valve 68 movable within the passage 66. The annular valve 68 is biased forward from the body 64 by a coil spring 76.

The annular valve 68 surrounds a plunger 78 that extends along the longitudinal axis X64. The tappet is fixed within the inner passage 66 and has an outer peripheral slot in which a sealing element 80 is received. In the example shown, the sealing element 80 is an O-ring.

The female element 4 also comprises a sealing element 82, which is housed in an inner peripheral slot provided at the distal end 70 of the cylindrical extension 72. In the example shown, the sealing element 82 is an O-ring.

The body 64 comprises a front sleeve 84, an intermediate sleeve 86, an outer sleeve 88, an adapter 90, and assembly balls 92. The front sleeve 84, the intermediate sleeve 86, the outer sleeve 88, the adapter 90 and the assembly balls 92 are fixedly assembled to each other by plastically deforming the proximal end of the outer sleeve 88 around a recess in the adapter 90 for the assembly balls 92.

The female element 4 also comprises a locking ring 94 mounted around the front sleeve 84 and the outer sleeve 88.

The locking ring 94 is pushed forward into a so-called "locking" position against an stop of the front sleeve 84 by a return spring 96, which is jointly supported on a front radial face 97 of the outer sleeve 88 and on a rear radial face 99 of the locking ring 94.

The locking ring 94 has a front face 98 and a locking face 100, both of which are oriented toward the axis X64. The front face 98 diverges forwardly from the longitudinal axis X64. The locking face 100 has the shape of a cylinder of circular cross-section, centered on the longitudinal axis X64.

The front sleeve 84 has an inclined face 102 and an outer annular slot 104 at a distal end 101. The inclined face 102 is convergent forwardly in relation to the longitudinal axis X64 and provided further forward than the outer annular slot 104. In the locking position of the locking ring 94, the angled face 102 extends beyond the front face 98 in the forward direction.

The outer annular slot 104 has a toroidal cross-sectional shape centered on the longitudinal axis X64, faces outward, and is adapted to partially receive the locking balls 62.

In the locking position, the locking face 100 is located opposite the outer annular slot 104 in a direction radial to the axis X64. The locking face 100 and the outer annular slot 104 then define a volume 106 for receiving the locking balls 62. In other words, the locking face 100 radially limits the receiving volume 106 so that the locking balls 62 are held in their inner position and cannot move to their outer position.

Under the action of a force exerted to the rear on the locking ring 94 and sufficiently high to overcome the spring 96, the locking ring 94 is capable of being displaced axially to the rear of the female element 4 into a so-called "unlocking" position. In the unlocked position, the locking face 100 is shifted to the rear in relation to the outer annular slot 104 and the receiving volume 106 is no longer radially limited by the locking face 100 but by the front face 98.

In the configuration of FIG. 1, the male element 2 is fitted with the female element 4, and the valve 18 is pushed back by the plunger 78, within the inner passage 8, toward the rear of the male element 2 into a so-called "open" position in which a fluid can pass freely through the inner passage 8. At the same time, the annular valve 68 is pushed back by the distal end 12 of the male element 2 into an open position, in which a fluid can freely flow through the inner passage 66.

Thus, the male element 2 and the female element 4 are both in an open position and the interior passages 8 and 66 communicate with each other and do not impede fluid flow. The sealing element 82 provides a seal between the cylindrical extension 72 and the cylindrical extension 14.

In FIG. 3, the male element 2 is not fitted over a female element 4. The valve 18 is pushed forward by the spring 20 and abuts the distal inner bulge 16. A sealing element 28, housed in an outer peripheral slot of the valve 18, then seals between the valve 18 and the distal inner bulge 16. The inner passage 8 is then sealed. The male element 2 is in a so-called "closed" position. In the example shown, the sealing element 28 is an O-ring.

When the male element 2 is not inserted into the female element 4, the annular valve 68 is pushed forward by the helical spring 76 into a closed position. The annular valve 68 then interacts with the sealing elements 80 and 82, sealing the inner passage 66. The female element 4 is in a so-called "closed" position.

In a first coupling phase, the cylindrical extension 14 of the male element 2 is brought closer to the female element 4 along the insertion axis X-X' and penetrates the front sleeve 84 until its distal end 12 comes into contact with the annular valve 68 and the valve 18 of the male element 4 comes into contact with the plunger 78. In a further step of the approach, the distal end 101 of the female element 4 enters the annular space 38 and the inclined face 102 pushes the locking balls 62 towards their outer position. The cylindrical extension 14 comes into sealing contact with the sealing element 82. As the approach continues, the locking balls 62, which now emerge from the outer face 36 of the ring 32, contact the front face 98 of the locking ring 94 and push the locking ring 94 back against the spring 96 until the locking balls 62 face the outer annular slot 104 of the body 64 of the female element 4. At this point, the locking ring 94 is pushed back by the spring 96 to its locking position and pushes the locking balls 62 back into the outer annular slot 104, inwardly, where they are held by the locking face 100 of the locking ring 96. The locking balls 62 then form an obstacle to the longitudinal movement of the cylindrical extension 72 of the female element 4 out of the annular space 38. The coupled configuration of the coupling R is achieved. The coupling of the pipe 7 with the pipe related to the female element 4 is then established. The coupling is said to be automatic since the only movement of the body 64 of the female element 4 and the body 6 of the male element 2 towards each other along the insertion axis X-X' allows the coupled configuration to be achieved.

To uncouple the coupling R, the operator moves the locking ring 94 to the unlocked position, allowing the locking balls 62 to move to the outer position and freeing the passage for the cylindrical extension 72 of the female element 4 out of the annular space 38. With the removal of the cylindrical extension 72, the valves 18 and 68 close.

The method for manufacturing and assembling the ring 32 of the male element 2 is now described.

In a preliminary step, the parts 40 and 42 are machined. In particular, the longitudinal slots 52 and the inner 56 and outer 57 projections are machined. This step can be carried out relatively easily because the walls 54 and 58 are well accessible since neither of them is a closed surface. In other words, machining is easier than where the ring is a single piece and the surfaces would have to be created in small holes. In particular, each longitudinal slot 52 is made with a milling cutter whose rotation axis is radial to axis X6 and whose diameter is slightly larger than the diameter D62 of a locking ball 62 over a height equal to the radial height of the cylinder part of the longitudinal slot 52. Two 30-degree chamfers on the milling cutter allow the longitudinal slot 52 and the inner 56 and outer 57 projections to be made in a single operation during the machining movement of the milling cutter along the longitudinal axis X6.

In a first assembly step, the second part 42 is arranged so that the longitudinal slots 52 face upward, i.e. the proximal bearing surface 46 faces upward. The balls 62 are inserted into a respective longitudinal slot 52 and, due to gravity, come to rest against the bottom of the slots 52. The inner projections 56 and outer projections 57, which were created in the pre-machining step, hold the balls 62 in the slots 52 in a direction radial to the axis X6.

In a second step, the first part 40 of the ring 32 is moved closer to the second part 42 and engaged with the second part 42. The skirt 48 is inserted into the annular space 38, making it easy to radially center the first part 40 in relation to the second part 42. Once the distal 44 and proximal 46 surfaces are brought into longitudinal contact with each other, each ball 62 is retained in its respective radial housing 60. In other words, the radial movement of the balls 62 is limited by the narrowings 56 of the radial housings 60. The longitudinal movement of the balls 62 is limited by the bottom of the slots 52 and by the second wall 58.

Preferably, the distal and proximal surfaces 44 and 46 are in surface contact with each other, which ensures a good geometry of the housings 60 and a good solidity of the male element 2.

Figure 4:
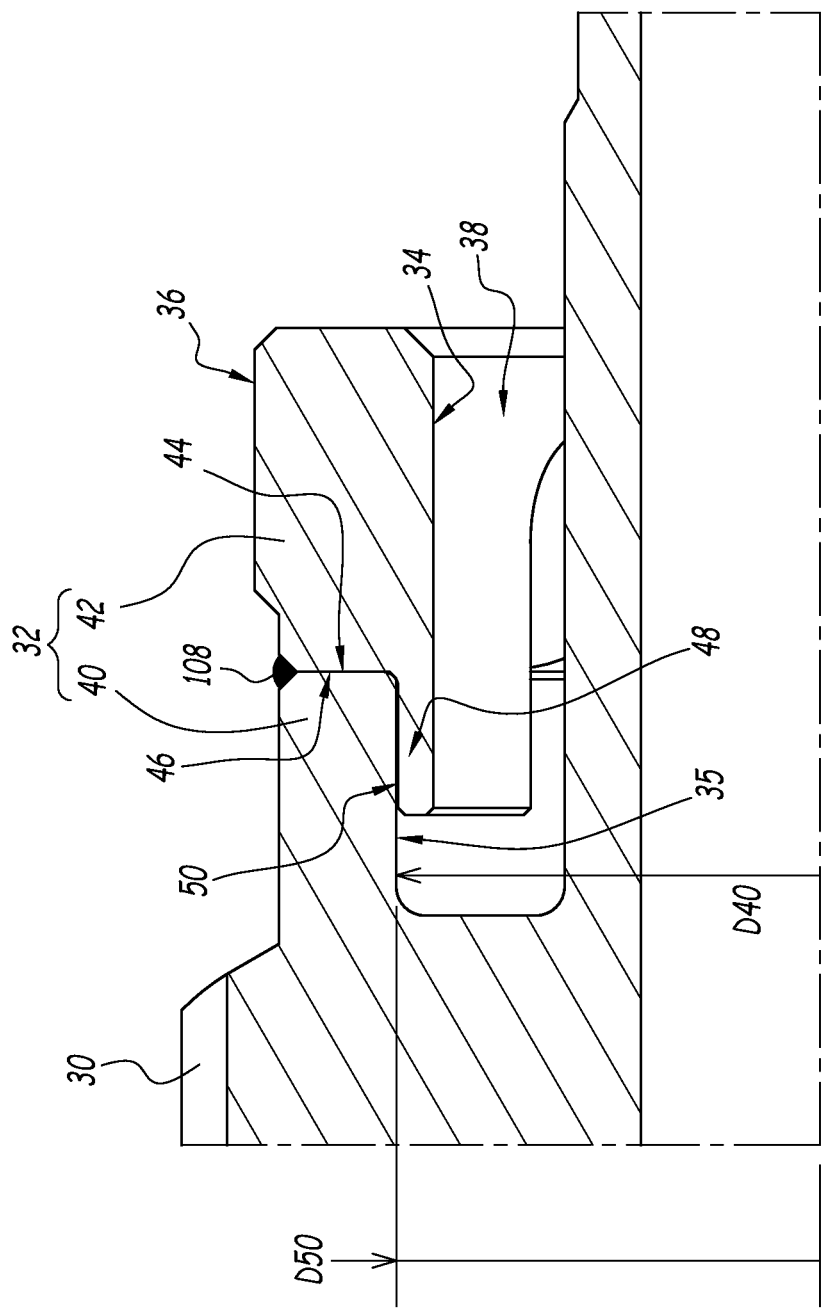
FIG. 4 is a larger scale section of a detail of the male element of FIG. 2, along a torque plane IV of FIG. 2.

Finally, the first and second parts 40 and 42 of the ring 32 are connected to each other. In the example shown in FIG. 4, the joining operation is performed by welding, preferably by welding without the addition of material, in the example by laser welding. In FIG. 4, the laser welding beam is focused at the junction of the distal 44 and proximal 46 bearing surfaces with the outer face 36 of the ring 32, with the laser welding resulting in a weld bead 108. The weld bead 108 secures the first and second parts 40 and 42 together in rotation about the axis X6 and in translation along the axis X6.

Advantageously, the contact of the distal and proximal bearing surfaces 44 and 46 between two consecutive longitudinal slots 52 is continuous, which facilitates welding and promotes a strong weld.

Figure 5:
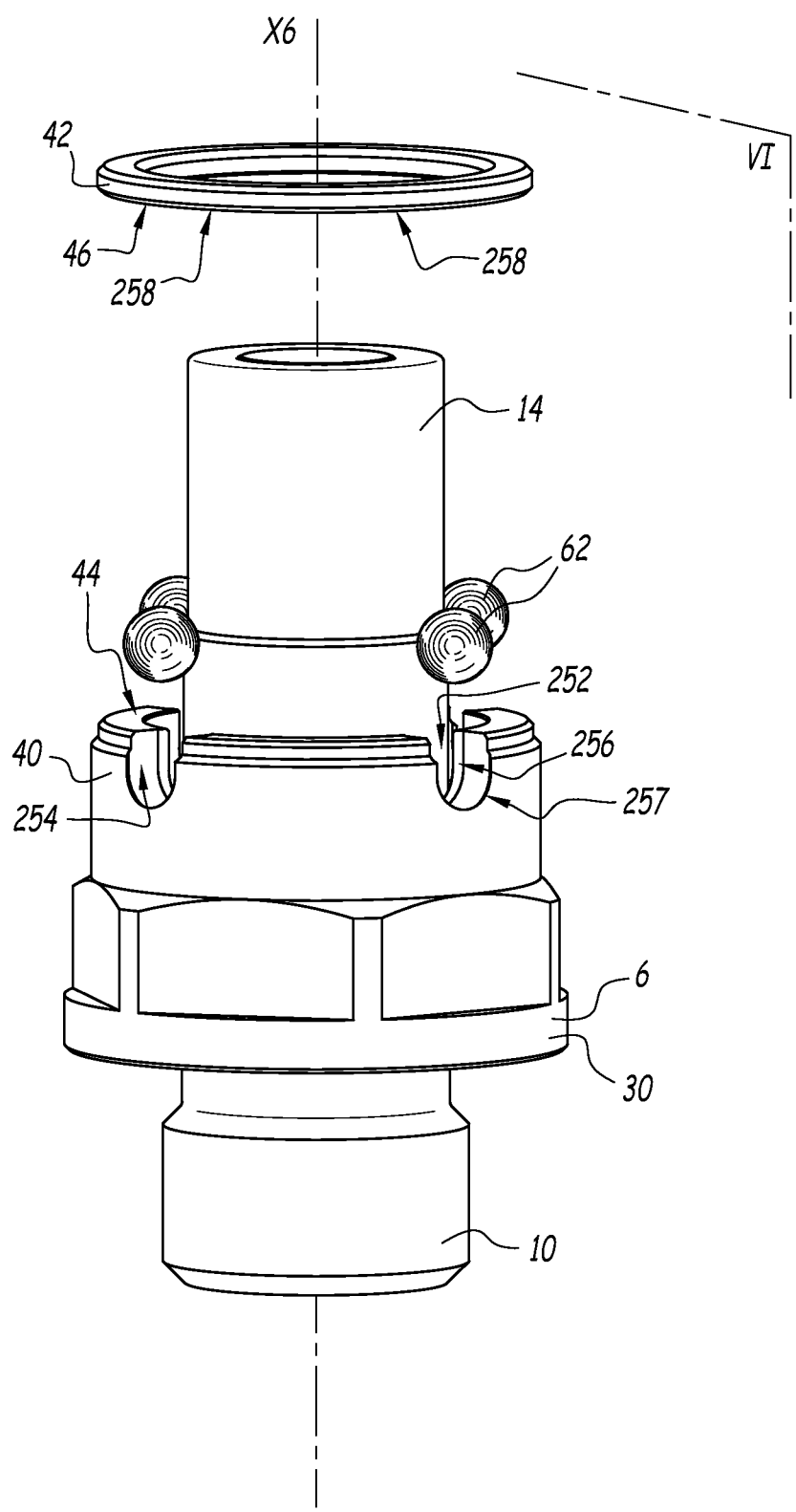
FIG. 5 is an exploded perspective view of certain components of a male coupling element according to a second embodiment of the invention, these components being the same as those shown in FIG. 2 for the first embodiment.

In the second through sixth embodiments of the male element 2 shown in FIG. 5 and following, the elements similar to those in the first embodiment have the same references and function in the same manner.

In particular, in the second through fifth embodiments, the distal surface 44 of the first part 40 and the proximal surface 46 of the second part 42 are in longitudinal contact with each other and are thus a distal bearing surface 44 and a proximal bearing surface 46, respectively. In the following, differences between the first and other embodiments are primarily described.

In the second embodiment of FIGS. 5 and 6, longitudinal slots 252, which are shaped like notches, are formed in the first part 40 of the ring 32. The longitudinal slots 252 each define a first wall 254. The longitudinal slots 252 open axially onto the distal surface 44 of the first part 40. In the second mode, the distal surface 44 forms both a mouthing surface and the distal bearing surface.

Inner 256 and outer 257 projections are provided at the intersection of the longitudinal slots 252 with the inner 34 and outer 36 faces of the ring, in particular at the junction of the first walls 254 with the inner 34 and outer 36 faces.

In FIG. 5, the male element 2 of the second embodiment is shown inverted vertically in relation to the male element 2 of the first embodiment shown in FIG. 2, to describe the fact that when the balls 62 are inserted into the longitudinal slots 252, the balls 62 are held by gravity within the longitudinal slots 252 until the first part 42 is assembled to the first part 40.

Here, the second part 42 has the shape of a washer, which is particularly simple to manufacture, with a proximal surface 46 facing the first part 40, which proximal surface 46 forms a proximal bearing surface similar to that of the first embodiment, which is in longitudinal contact with the distal surface 44 forming a distal bearing surface.

The distal surface 44 faces along the longitudinal axis X6 a surface of the second part 42. In other words, the distal surface 44 and the second part 42 face each other and are aligned along an axis parallel to the longitudinal axis X6. The distal surface 44 faces along the longitudinal axis X6 of the proximal surface 46.

The parts of the proximal bearing surface 46 located on the second part 42 opposite each longitudinal slot 252 define second walls 258.

For each longitudinal slot 252, the first wall 254, the second wall 258 located opposite this slot 252 along the longitudinal axis X6 and the inner 256 and outer 257 projections of this slot 252 define a radial housing 60. The inner 256 and outer 257 projections constitute a narrowing of the radial housing 60 at the inner 34 and outer 36 faces.

During the operation of joining the second part 42 to the first part 40, in particular by welding, specific tooling must be used to guarantee the correct relative positioning of the parts. In particular, good contact between the distal and proximal bearing surfaces 44 and 46 and good centering of the first and second parts 40 and 42 on the axis X6 during the joining operation are necessary so that the assembled male element 2 has a correct geometry and each ball 62 is retained in the radial housing 60 in which this ball 62 is housed.

In a variant, not shown, the second part 42 may include a guiding skirt to ensure radial centering of the second part 42 relative to the first part 40 during assembly of the ring 32. The skirt may be annular or formed of annular parts. The skirt may fit around the first part 40.

Figure 7:
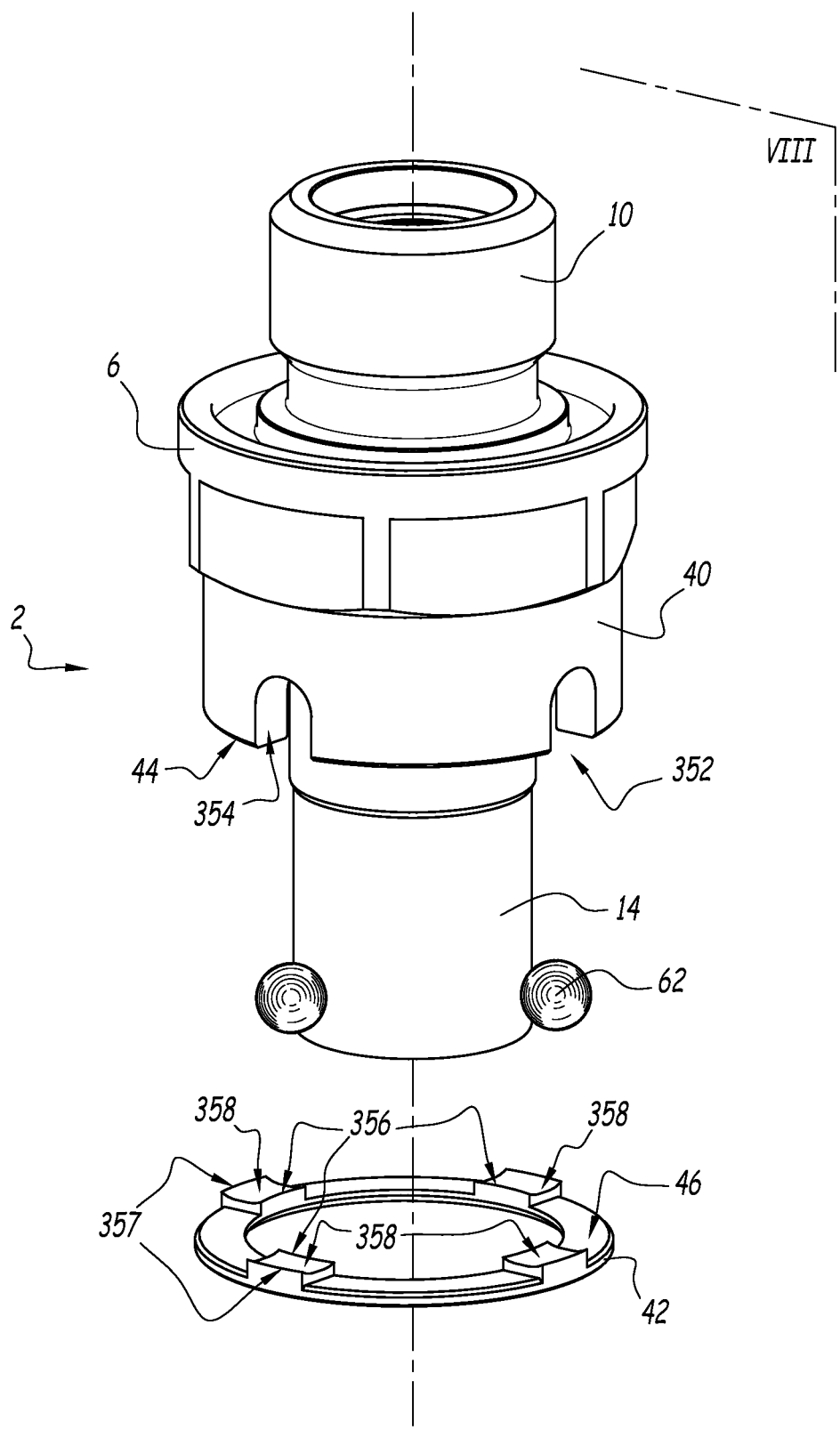
FIG. 7 is an exploded perspective view of certain components of a male fitting element according to a third embodiment of the invention, these components being the same as those shown in FIG. 2 for the first embodiment.
Figure 9:
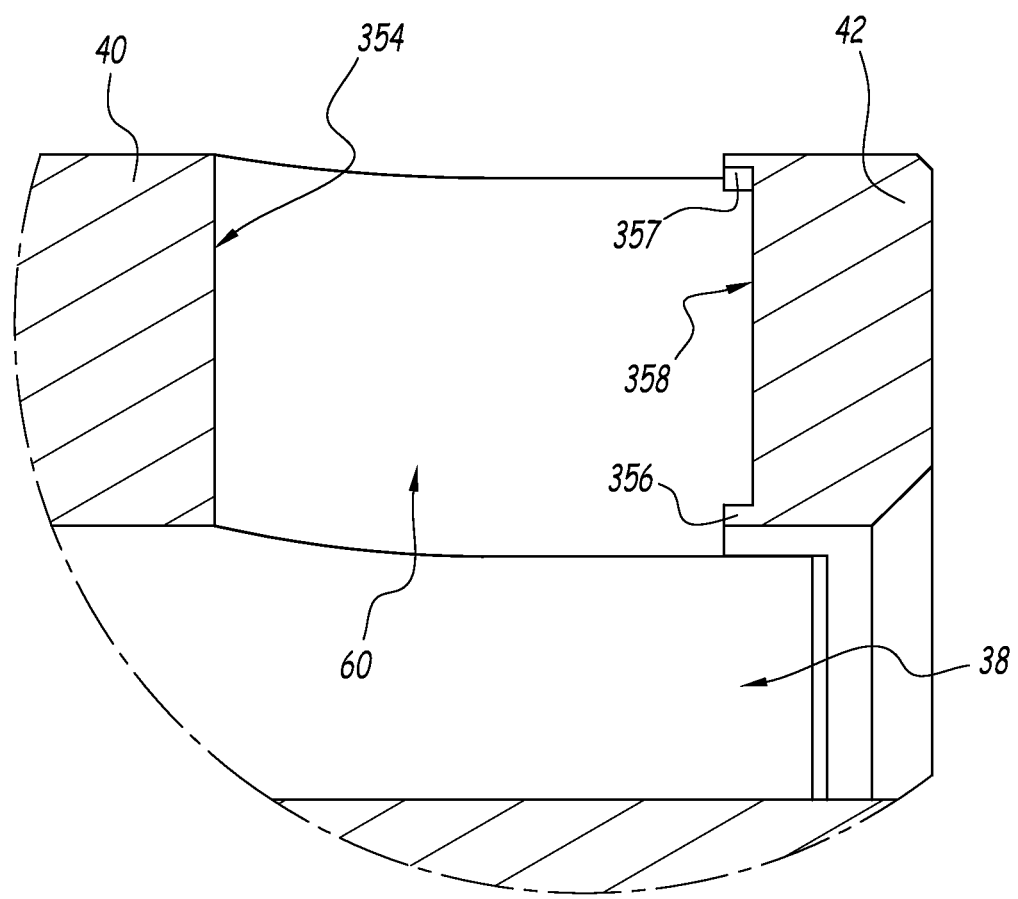
FIG. 9 is a cross-section analogous to FIG. 8 of a male element according to a variant of the third embodiment with some elements omitted for ease of reading.

In the third embodiment shown in FIGS. 7 through 9, longitudinal slots 352, which are shaped like notches, are formed in the first part 40 of the ring 32. The longitudinal slots 352 each define a first wall 354. The longitudinal slots 352 open axially onto the distal surface 44 to the rear. The distal surface 44 forms a mouth surface, which faces along the longitudinal axis X6 of the proximal surface 46 of the second part 42. The distal surface 44 is further in longitudinal contact with the proximal surface 46. In the third mode, the distal surface 44 and proximal surface 46 are thus distal and proximal bearing surfaces 44 and 46.

There is an intersection between the first wall 54 and the distal bearing surface 44. The second part 42 includes second walls 358, which are provided protruding from the proximal bearing surface 46, each second wall 358 being engaged in a longitudinal slot 352 in the assembled configuration of the ring 32.

Inner 356 and outer 357 projections are provided here on each second wall 358 at the junction of the second wall 358 with the inner 34 and outer 36 faces of the ring 32, respectively.

For each longitudinal slot 352, the first wall 354, the second wall 358 located opposite this slot 352 along the longitudinal axis X6 and the inner 356 and outer 357 projections define a radial housing 60, the inner 356 and outer 357 projections constituting a narrowing of the radial housing 60 at the level of the inner 34 and outer 36 faces of the ring 32.

In the third embodiment, machining of the longitudinal slots 352 in the first part 40 can be performed simply, such as by milling.

The machining of the second part 42, in particular the machining of the second walls 358 and the inner 356 and outer 357 projections remains easy because the associated surfaces are easily accessible.

Two variants of the inner projections 356 and outer projections 357 are shown in FIGS. 8 and 9, knowing that in both cases the inner projections 356 and outer projections 357 constitute narrowings of the radial housing 60. In FIG. 8, the second wall 358 facing the radial housing 60 has a curved and concave profile, particularly in the shape of a circular arc. In FIG. 9, the second wall 358 facing the radial housing 60 has a planar profile and the inner 356 and outer 357 projections have a rectangular cross-section.

In a variant, not shown, the second part 42 may include a guiding skirt to facilitate its radial centering in relation to the first part 40 and the positioning of the balls 62 during assembly of the ring 32.

In a variant, not shown, the second walls 358 may be parts of the proximal bearing surface 46. In this case, the second walls 358 are not engaged in the slots 352 but located opposite in the longitudinal direction of the slots 352.

Figure 10:
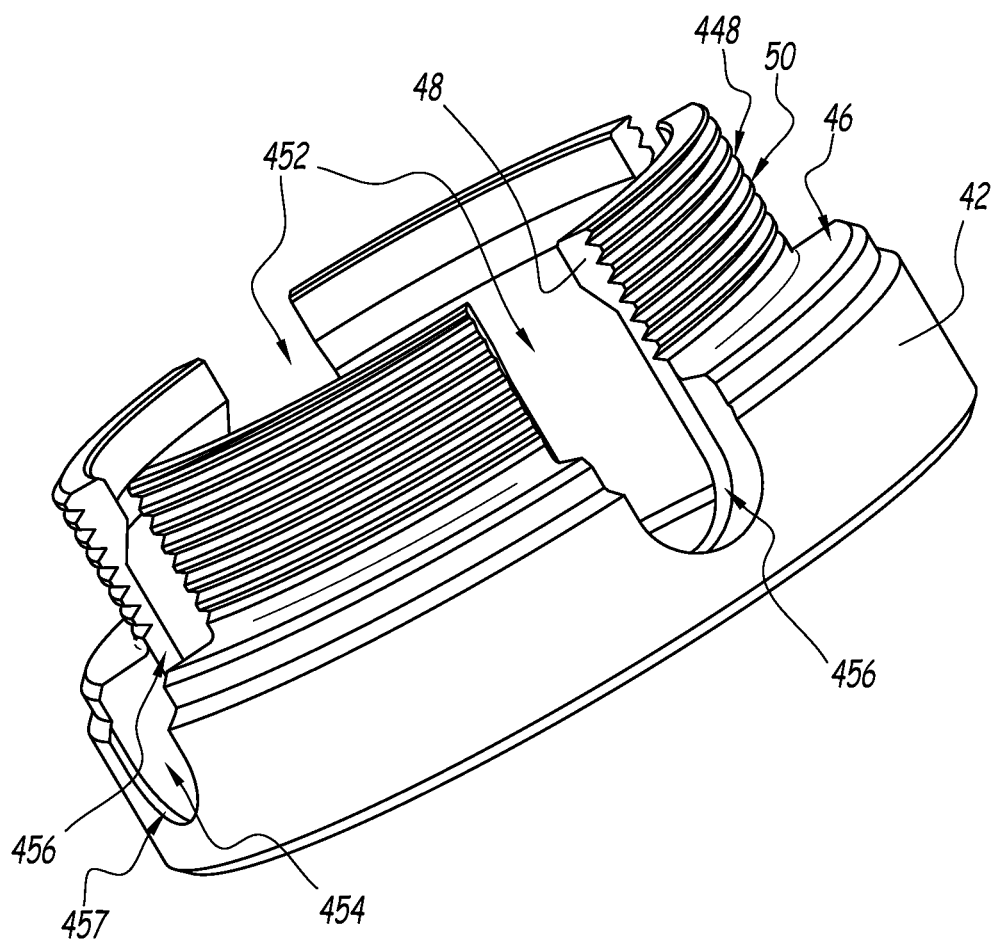
FIG. 10 is a perspective view of a part of a male coupling element according to a fourth embodiment of the invention.
Figure 11:
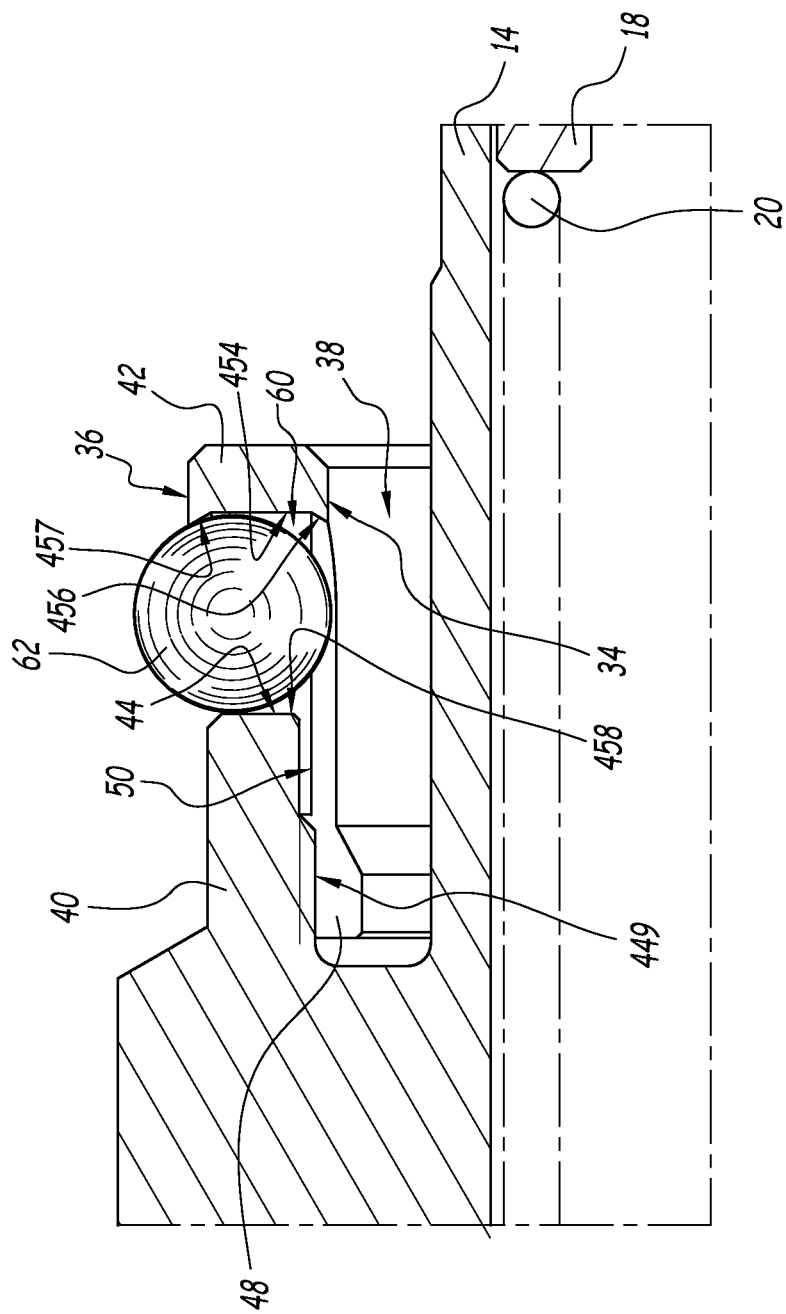
FIG. 11 is a cross-section of a male coupling element according to the fourth embodiment and comprising the part of FIG. 10, the plane of this cross-section being analogous to that of FIG. 3.
Figure 12:
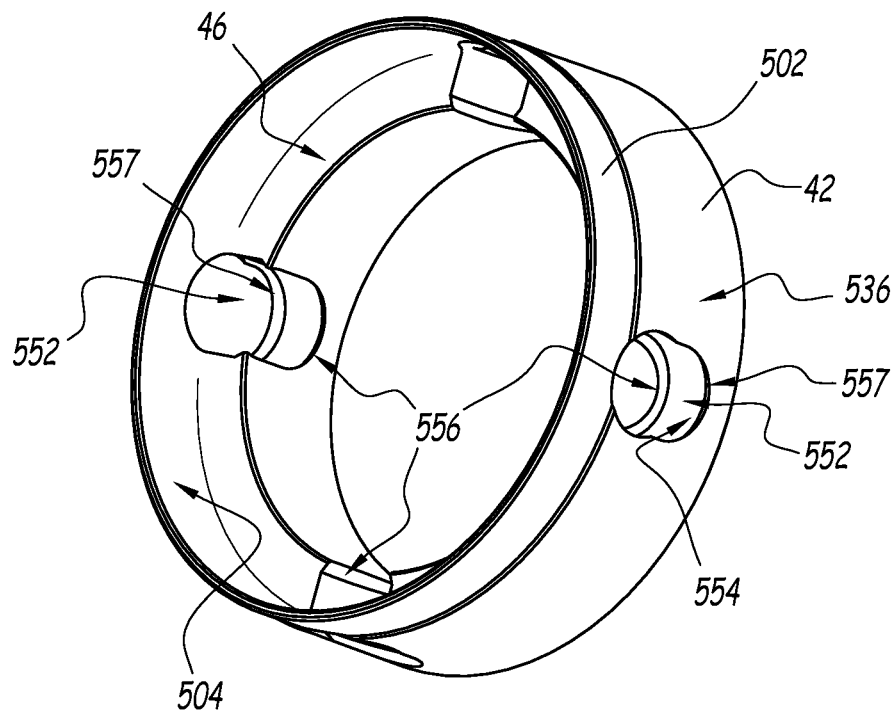
FIG. 12 is a perspective view of a part of a male coupling element according to a fifth embodiment of the invention.

The fourth embodiment shown in FIGS. 10 and 11 resembles the first embodiment in that the longitudinal slots 452 with first wall 454 are notches provided in the second part 42 and the inner 456 and outer projections 457 are also provided in the second part 42. The longitudinal slots 452 open axially from the proximal surface 46, which also forms a mouth surface. In the assembled configuration of the first and second parts 40 and 42, the proximal surface 46 faces along the longitudinal axis of the distal surface 44 of the first part 40.

The fourth mode differs from the first mode primarily in that the skirt 48 has a thread 448, provided on the outer surface 50 of the skirt 48. The thread 448 interacts with a complementary thread 449 provided on an inner surface of the first part 40 of the ring 32. When the skirt 48 is finally screwed into the thread 449, the distal surface 44 of the first part 40 is in longitudinal abutment with the proximal surface 46 of the second part 42 and the distal bearing surface 44 forms the second wall 458 of the radial housings 60. Thus, the distal 44 and proximal 46 surfaces are also distal and proximal bearing surfaces, which are in longitudinal contact with each other.

During assembly, the skirt 48 facilitates the radial centering of the second part 42 in relation to the first part 40, and the interaction of the thread 448 with the inner thread 449 constitutes a means of reversible longitudinal translation of the first part 40 with the second part 42.

This reversible coupling may be completed by a definitive coupling, if necessary, such as welding as described above, with this example not being limiting.

In the fifth embodiment shown in FIGS. 12 to 15, the second part 42 is made of brass. The second part 42 includes a wall 502, which extends axially from the proximal bearing surface 46 to the rear and extends an outer radial surface 536 of the second part 42. The wall 502 has an inner surface 504, which is oriented toward the longitudinal axis X6. The wall 502 is designed and fabricated to be plastically deformable using conventional tools.

Longitudinal slots 552 in the form of oblong slots are formed in the second part 42. Each longitudinal slot 552 opens onto the outer radial surface 536 of the second part 42 through an oblong, axially oriented hole of closed cross-section, and includes a distal part 540 and a proximal part 560, visible in FIG. 15 and forming the first wall 554. The distal part 540 has a first wall 554 with, along the axis X6, a bottom in the form of a part of a cylinder of axis A52 radial to the longitudinal axis X6, the proximal part 560 having, along the axis X6, a bottom in the form of a part of a cylinder of radial axis parallel to the axis A52.

The longitudinal slots 552 open axially onto the proximal surface 46 of the second part 42. The proximal surface 46 thus forms a mouth surface of the second part 42. In the assembled configuration of the first and second parts 40 and 42, the proximal surface 46 partially faces the distal surface 44 of the first part 40 along the longitudinal axis X6. As in the previous embodiments except for the second embodiment, in the fifth embodiment each slot 552 opens onto the proximal surface 46 in an intermediate longitudinal region of the slot 552 and not at the longitudinal end of the slot 552. In other words, there is an intersection between the proximal surface 46 and the first wall 554.

Inner 556 and outer 557 projections are provided on the distal part 540 at the junction of each longitudinal slot 552 with the inner radial surface or outer radial surface 536 of the second part 42, respectively, corresponding to the inner 34 and outer 36 faces of the ring 32 when the first and second parts 40 and 42 are assembled. The inner 556 and outer 557 projections define an inner passage diameter D53 and an outer passage diameter D55, respectively. The diameter D53 being visible in FIG. 13, while the outer passage diameter D55 being visible in FIG. 15. The proximal part 560 has a passage diameter D560 along its entire radial height. The passage diameter D560 is larger than the diameter D55. In particular, the passage diameter D560 is greater than the diameter D62 of a ball 62, allowing insertion of a ball 62 through the proximal part 560 of the longitudinal slot 552 in a direction radial to the longitudinal axis X6, upon assembly of the first part 40 with the second part 42, and then into the distal part 540 by moving the ball 62 parallel to the longitudinal axis X6. As in previous embodiments, the outer passage diameter D55 and the inner passage diameter D53 are smaller than the diameter D62, whereby the balls 62 are retained radially in the radial housings 60 when the second part 42 is assembled to the first part 40. When the second part 42 is assembled to the first part 40, the distal surface 46 of the first part 40 forms the second wall 558 of each radial recess 60 of a locking ball 62.

Figure 13:
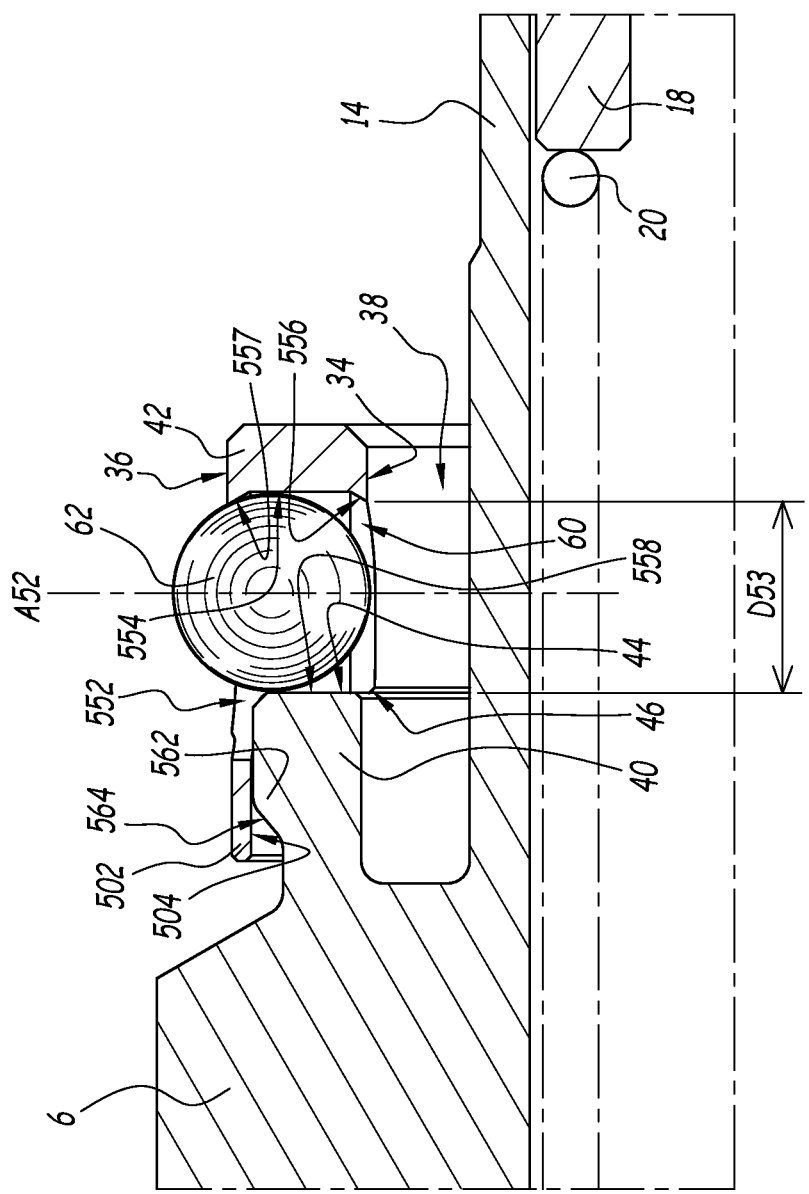
FIG. 13 is a cross-sectional view of a male coupling element conforming to the fifth embodiment and comprising the part of FIG. 12, illustrating a step of the assembly method according to the invention, the plane of this cross-section being analogous to that of FIG. 3.
Figure 14:
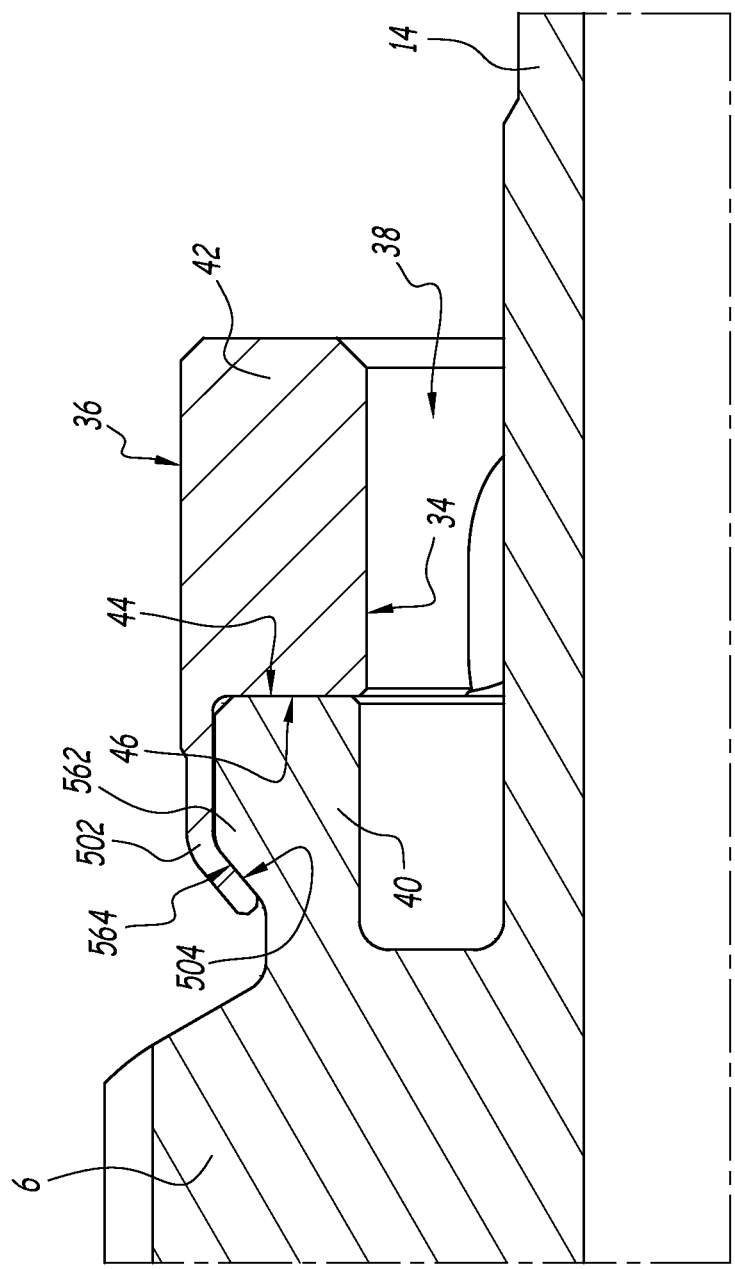
FIG. 14 is a cross-section of the male coupling element of FIG. 13 along another cross-sectional plane, illustrating another step in the method for assembling the male element, subsequent to the step illustrated in FIG. 13, the plane of this cross-section being analogous to that of FIG. 4.
Figure 15:
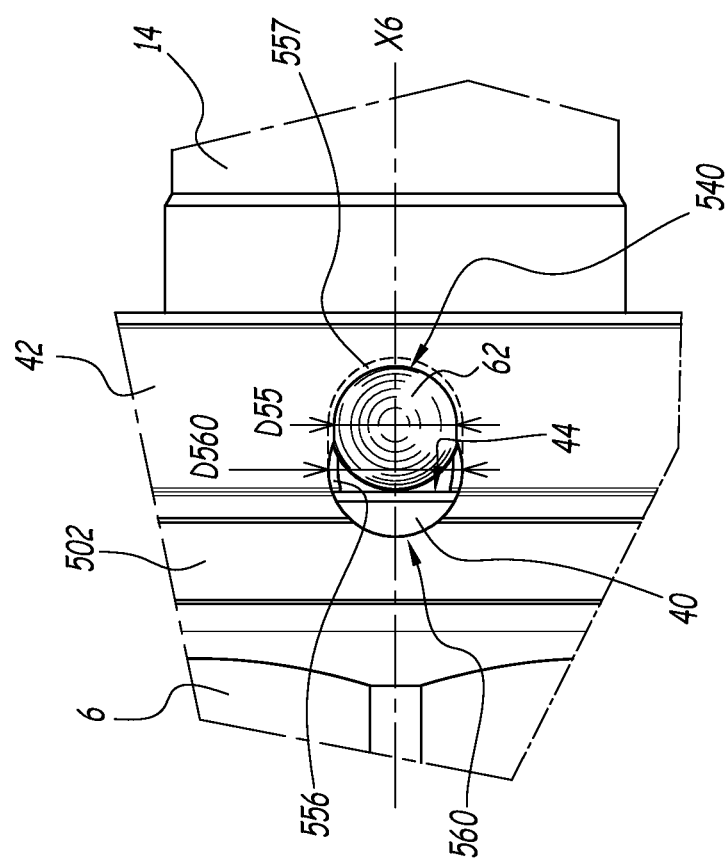
FIG. 15 is a view of a detail of the male coupling element of FIGS. 13 and 14.

The first part 40 comprises a shoulder 562, visible in FIGS. 13 and 14. The shoulder 562 is provided at the outer periphery of the first part 40 and has a bearing surface 564, which is inclined in relation to the longitudinal axis X6 and converges towards the rear of the male element 2.

FIGS. 13 and 14 detail the interlocking steps of the assembly method for the ring 32.

When the balls 62 are engaged in the distal part 540, the wall 502 is engaged around the shoulder 562, to reach the configuration of FIG. 13 where the distal surface 44 is in axial abutment with the proximal surface 46. Thus, the distal surface 44 and proximal surface 46 are also distal and proximal bearing surfaces, which are in longitudinal contact with each other. During assembly, the wall 502 interacts radially with the first part 40 to provide radial centering of the second part 42 relative to the first part 40. In other words, the wall 502 also serves the function of a guiding skirt.

Next, the wall 502 is plastically deformed to the configuration shown in FIG. 14, in which the wall 502 interacts with the shoulder 562 to axially retain the second part 42 on the first part 40. The inner surface 504 of the wall 502 then contacts a cylindrical radial outer surface of the first part 40 and the bearing surface 564 of the shoulder 562.

In the fifth embodiment, the coupling of the second part to the first part is made by crimping the wall 502, whereas in the other embodiments, the coupling is made by welding.

In other words, the first and second parts 40 and 42 are axially secured to each other by plastic deformation of the wall 502 on the shoulder 562 of the first part 40.

In the example, the plastic deformation of the wall 502 is achieved by crimping. More generally, the method of joining by crimping allows in particular the assembly of parts whose materials are not suitable for welding, such as brass.

Figure 16:
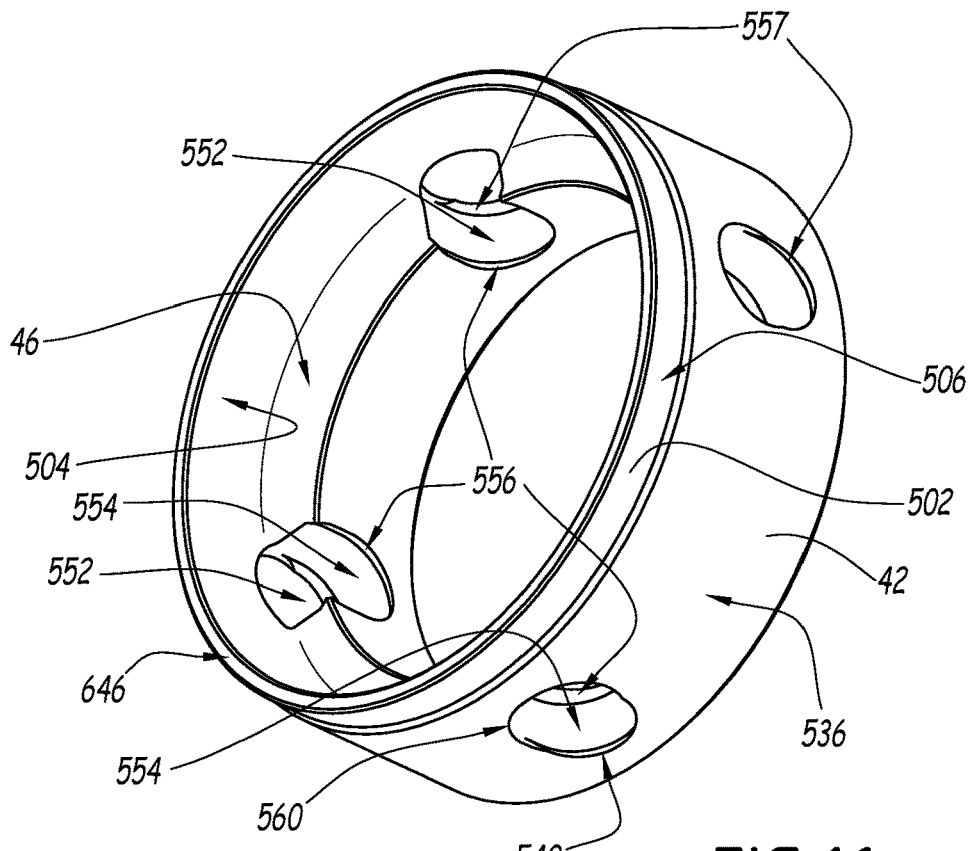
FIG. 16 is a perspective view of a part of a male coupling element according to a sixth embodiment of the invention.
Figure 17:
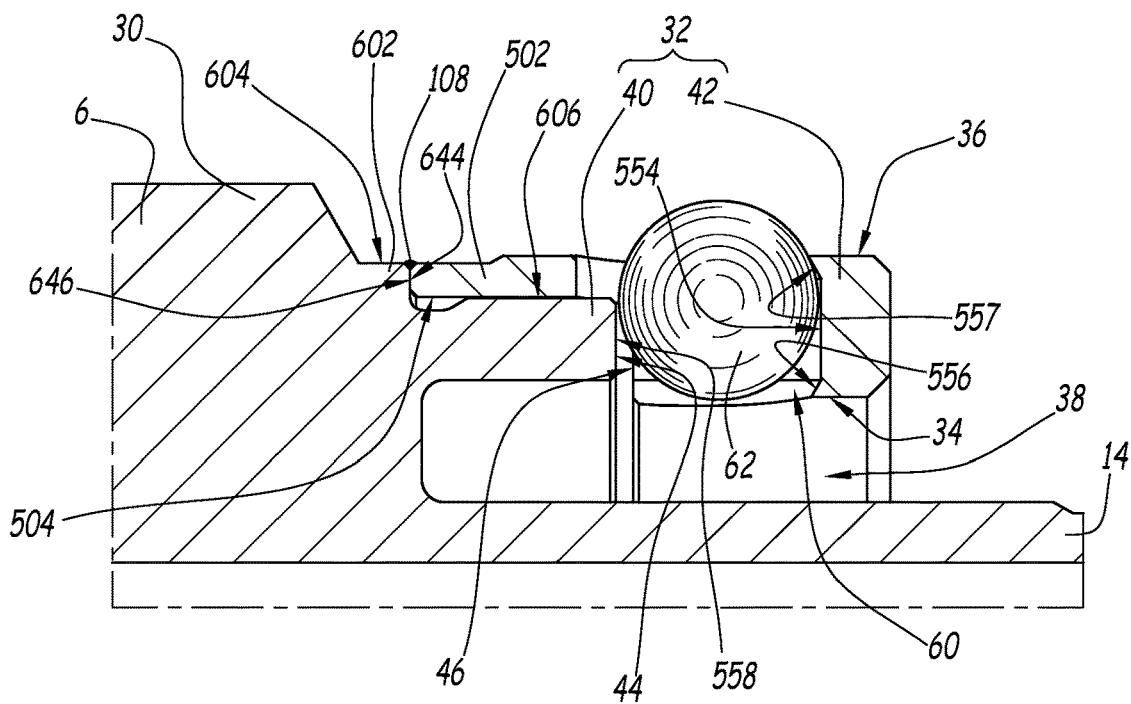
FIG. 17 is a cross-sectional view of a male connector element according to the sixth embodiment and comprising the part of FIG. 16, illustrating a step of the assembly method according to the invention, the plane of this cross-section being analogous to that of FIG. 13.
Figure 18:
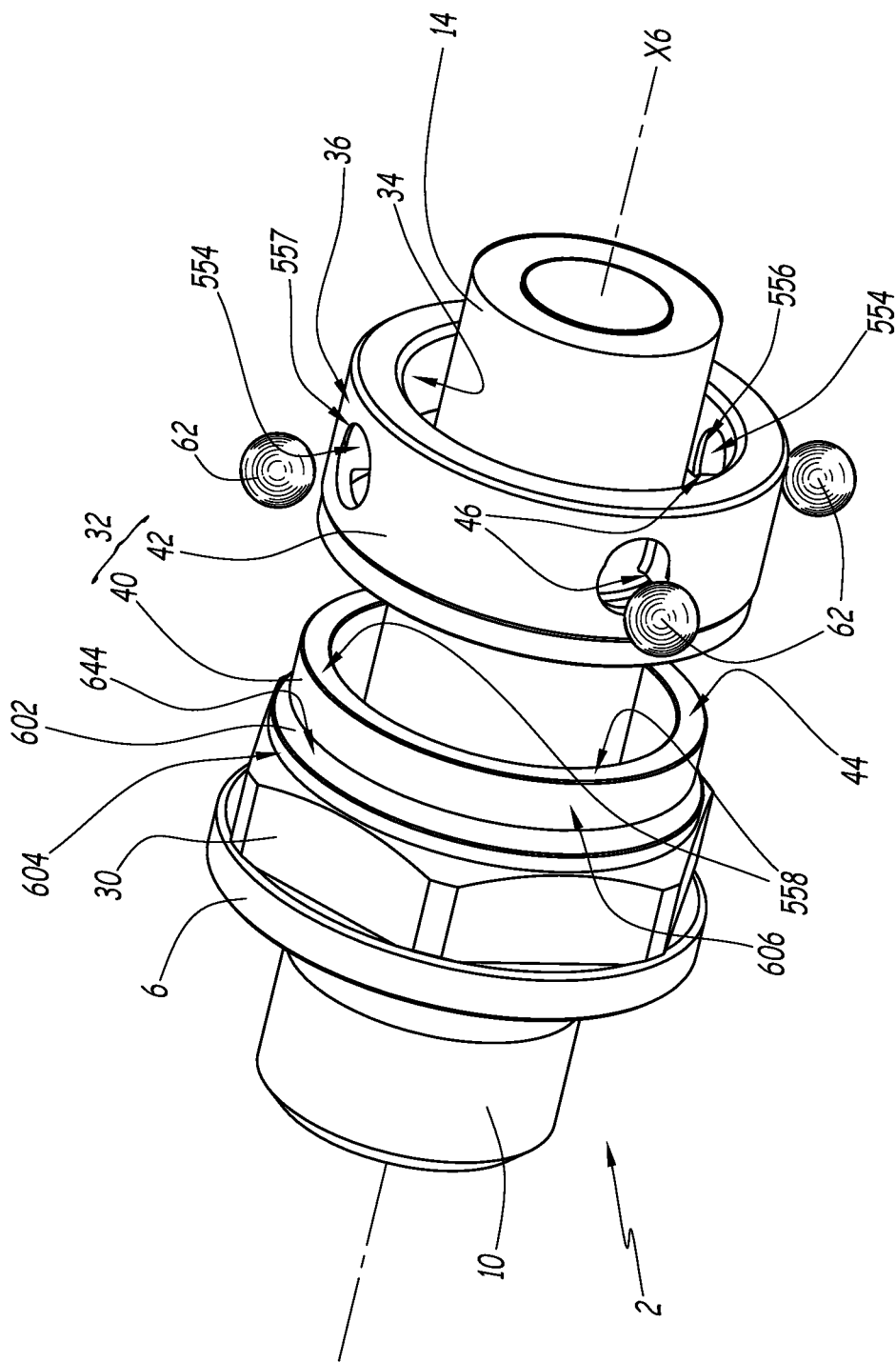
FIG. 18 is a partially exploded perspective view of the male element of FIG. 17.

The sixth embodiment shown in FIGS. 16 to 18 is similar to the fifth embodiment in that the second part 42 comprises a wall 502, which extends axially from the proximal surface 46 to the rear and extends a radially outer surface 536 of the second part 42.

As in the other embodiments, the longitudinal slots 552 extend radially through the ring part 40 or 42 on which they are provided. In the sixth embodiment, the proximal surface 46 also constitutes a mouth surface of this ring part 40 or 42 on which the slots 552 axially open. The proximal surface 46 and the longitudinal slots 552 are clearly visible in FIG. 16.

As in the first, fourth, and fifth embodiments, the distal surface 44 is a planar peripheral surface, orthogonal to the longitudinal axis X6, extending all around the longitudinal axis X6, and parts of which form the second walls 558 of the radial housings 60. The distal surface 44 is clearly visible in FIG. 18.

One of the main differences of the sixth mode from all other modes is that in the sixth mode, the mouth surface formed by the proximal surface 46 is at least partially facing the distal surface 44 along the longitudinal axis, without the distal 44 and proximal 46 surfaces necessarily being in longitudinal contact with each other. In FIG. 17, the distal 44 and proximal 46 surfaces, as viewed from the cross-sectional plane, are not in longitudinal contact with each other.

The first part 40 is axially integral with a shoulder 602, which is provided at the junction between the ring 32 and the flange 30 and defines a distal bearing surface 644, which faces forward and is orthogonal to the axis X6, and an outer surface 604, which is cylindrical in shape, circular in cross-section, and centered on the axis X6, and extends to the rear from the shoulder 602.

The first part 40 also comprises an outer radial surface 606, which has a cylindrical shape, circular cross-section, and is centered on the axis X6. The outer surface 604 has a radius greater than a radius of the radial outer surface 606 of the first part. The distal bearing surface 644 is provided all around the distal surface 44 forming the second walls 558 of the radial housings 60, to the rear of the second walls 558.

In the illustrated example, the shoulder 602 is machined directly into the body 6. In a variant, not shown, the shoulder 602 is formed by an insert, which is secured to the body 6, particularly by welding. The distal bearing surface 644 may thus be provided at the flange 30 or at any other part of the body 6 that is axially integral with the first part 40. This part of the body 6 may be the first part 40.

The wall 502 of the second part 42 comprises an outer surface 506 opposite the inner surface 504. The outer surface 506 has a cylindrical shape, circular in cross-section and centered on the axis X6. The inner surface 504 and outer surface 506 are connected to each other by a proximal bearing surface 646, which is here oriented to the rear of the male element 2 and has a ring shape and is orthogonal to the axis X6.

In the assembled configuration of the male element 2, as shown in FIG. 17, the distal bearing surface 644 and the proximal bearing surface 646 are in longitudinal contact with each other, as are the surfaces 44 and 46 in the other embodiments. Upon assembly, the inner surface 504 of the wall 502 radially interacts with the radially outer surface 606 of the first part 40 to provide radial centering of the second part 42 relative to the first part 40. In other words, the wall 502 is also a guiding skirt, which radially interacts with the first part 40 to provide radial centering of the second part 42 relative to the first part 40.

Advantageously, the outer surface 506 of the wall 502 and the outer surface 604 of the shoulder 602 have the same radius, to facilitate welding, shown by the weld bead 108, which axially and about the axis X6 joins the first part 40 to the second part 42. Advantageously, as the distal bearing surface 644 and proximal bearing surface 646 are both annular and extend without discontinuity all around the longitudinal axis X6, the weld bead 108 is continuous all around the longitudinal axis X6. The second part 42 of the sixth embodiment is thus made of a material that is compatible with welding, such as stainless steel.

The distal part 540 of each longitudinal slot 552 includes an outer projection 557. The inner projection 556 of each longitudinal slot 552 is provided at both the distal part 540 and the proximal part 560 of the longitudinal slot 552, at the junction with the inner radial surface of the second part 42 defining the inner radial face 34 of the ring 32.

Upon assembly of the ring 32, a ball 62 is engaged in the proximal part 560 of each longitudinal slot 552 from the outer radial surface 536. To accomplish this, the diameter of passage of the proximal part 560 at the outer radial surface 536 is greater than the diameter D62 of a ball 62. Then the second walls 558 are brought to face each longitudinal slot 552 along the longitudinal axis X6. The second walls 558 push the balls 62 into the distal parts 540. The first part 40 and the second part 42 are joined together. Each second wall 558 then being provided in an intermediate longitudinal region of the longitudinal slot 552, i.e., at a longitudinal distance from the longitudinal ends of the slot 552.

In a variant embodiment not shown, for the sixth embodiment, the proximal surface 46 is not orthogonal to the longitudinal axis X6 but inclined in relation to the longitudinal and radial directions. In a variant embodiment not shown, the proximal surface 46 may also not be flat.

In a variant embodiment not shown, and for all embodiments, other methods of connecting the first part 40 to the second part 42 along the longitudinal axis X6 and around the longitudinal axis X6 are possible. In particular, as in the sixth embodiment, the second part 42 may be attached to the body 6, the body 6 itself being attached to the first part 40, the first and second parts 40, 42 thus being attached to each other. Of course, the method of attachment is chosen according to the materials and operating conditions. As a non-limiting example, the coupling can be made by gluing.

More generally, regardless of the embodiment, it is clearly understood that each radial housing 60 is delimited by a longitudinal slot 52, 252, 352, 452 or 552 on the front or on the back, provided on one or the other of the first or second part 40 or 42 of the ring 32, as the case may be. The longitudinal slots 52, 252, 352, 452 or 552 each have a first wall 54, 254, 354, 454 or 554 and open axially onto the distal or proximal surface 44 or 46 of said first or second part 40 or 42 in which the longitudinal slots 252, 352, 452 or 552 are provided.

Conjointly, each radial housing 60 is also delimited along the longitudinal axis X6 by a second wall 58, 258, 358, 458 or 558 located opposite each longitudinal slot 52, 252, 352, 452 or 552 and provided on the other of the first or second part 40 or 42.

The first wall 54, 254, 354, 454 or 554 is then opposite the second wall 58, 258, 358, 458 or 558 along the longitudinal axis X6, with the ball 62 only interposed.

Each radial housing 60 accommodates a single ball 62 and is delimited in the two opposite orthoradial directions by the first wall 54, 254, 354, 454 or 554 of the longitudinal slot 552.

The first wall 54, 254, 354, 454 or 554 radially guides the ball 62 from its inner position to its outer position and back again. The second wall 58, 258, 358, 458 or 558 radially guides the ball 62 from its inner position to its outer position and vice versa.

In the first, fourth, fifth and sixth embodiments, the longitudinal slots 52, 452 and 552 are provided in the second part 42, while the second walls 58, 458 and 558 are formed by parts of the distal surface 44 of the first part 40. Conversely, in the second embodiment, the longitudinal slots 252 are provided in the first part 40, while the second walls 258 are formed by parts of the proximal surface 46 of the second part 42.

In the first, third, fourth, fifth and sixth embodiments, each second wall 58, 258, 358, 458, 558 is provided in the intermediate longitudinal region of the longitudinal slot 52, 452, 552.

In the six embodiments described, the inner 56, 256, 356, 456, or 556 and outer 57, 257, 357, 457, or 557 projections are provided in only one of the first part 40 and the second part 42.

More generally, the longitudinal slots 52, 252, 452 or 552 are provided in one of the first or second parts 40 or 42, while the proximal or distal surface 46 or 44 of the other of the first or second parts 42 or 40 forms the second wall 58, 258, 458, 558 of each radial housing 60.

In each radial housing 60, the inner 56, 256, 356, 456, or 556 and outer 57, 257, 357, 457, or 557 projections may be located on either of the first or second parts 40 or 42. In particular, in an embodiment not shown, the inner projection (s) 56, 256, 356, 456 or 556 are provided on one of the first part 40 and the second part 42 of the ring 32 and the outer projection(s) 57, 257, 357, 457 or 557 are provided on the other of the first part 40 and the second part 42 of the ring 32. In any case, the inner 56, 256, 356, 456 or 556 and outer 57, 257, 357, 457 or 557 protrusions form narrowings that retain the ball 62 inserted in each radial housing 60.

In a variant embodiment not shown, the outer projections 57, 257, 357, 457 or 557 may be provided together on the first and second parts 40 and 42. In a variant embodiment not shown, inner projections 56, 256, 356, 456 or 556 may be provided together on the first and second parts 40 and 42.

More generally, it is understood that, in order for each ball 62 to be retained in a respective radial housing 60, each radial housing 60 must include at least one inner projection 56, 256, 356, 456 or 556 and at least one outer projection 57, 257, 357, 457 or 557. In other words, at least one of the first or second walls 40 or 42 has an outer projection 57, 257, 357, 457, or 557 located at the junction of the walls of each radial housing 60 with the outer face 36 of the ring 32, while at least one of the first or second walls 40 or 42 has an inner projection 56, 256, 356, 456, or 556 at the junction of the walls of each radial housing 60 with the inner face 34 of the ring 32.

In an unshown variant, applicable to all embodiments, the inner and/or outer projections may be made only on a part or parts of the periphery of the first wall of the longitudinal slots and not on the entire junction between the first wall and the respective inner 34 or outer face 36, preferably at the bottom in a cylinder part of the longitudinal slots.

The above-mentioned embodiments and variants can be combined with each other to generate new embodiments of the invention.

The invention claimed is:

1. A male element of a fluidic coupling for coupling with a female element, the male element comprising a hollow body, which extends along a longitudinal axis and which has a distal cylindrical extension, the male element also comprising a ring axially integral with the body, which surrounds the cylindrical extension and has an inner face and an outer face, the inner face of the ring defining an annular space with the cylindrical extension, radial housings being provided in the ring, the male element further comprising locking balls housed in the radial housings and which are movable radially between an inner position, in which the balls partially emerge from the inner face of the ring, and an outer position, in which the balls do not emerge from the inner face of the ring, the balls being radially retained within their respective radial housing by narrowings comprised of inner projections, the locking balls being arranged in the inner face of the ring and outer projections which are formed where each respective radial housing meets the inner and outer faces of the ring, wherein:

the ring is formed by assembling a first part and a second part, the first and second parts being integral with each other along the longitudinal axis, the first part being axially integral with a distal bearing surface orthogonal to the longitudinal axis, the second part being annular and comprising a proximal bearing surface, the proximal and distal bearing surfaces being in longitudinal contact with each other, longitudinal slots are provided in one of the first or second parts of the ring, the longitudinal slots each having a first wall and opening axially onto a mouth surface of this part of the ring, the mouth surface being at least partially opposite a surface of the other of the first or second parts of the ring along the longitudinal axis, while the other of the first or second parts of the ring has second walls opposite each longitudinal slot along the longitudinal axis, each radial housing being delimited by the first wall of the longitudinal slot and the opposite second wall, at least one of the first or second walls has the outer projection or at least one of the outer projections located at the junction of the walls of each radial housing with the outer face of the ring, and at least one of the first or second walls has the inner projection or at least one of the inner projections located at the junction of the walls of each radial housing with the inner face of the ring, the inner and outer projections extending into each radial housing and forming the radial retaining narrowings for the locking balls in the radial housing.

2. The male element according to the claim 1, wherein the longitudinal slots are provided in the second part.

3. The male element according to claim 1, wherein each second wall is arranged in an intermediate longitudinal region of the longitudinal slot.

4. The male element according to claim 1, wherein the first part is integral with the cylindrical extension.

5. The male element according to claim 1, wherein the inner and outer projections are provided in only one of the first part and the second part.

6. The male element according to claim 1, wherein the inner and outer projections are provided at the junction of the first wall with the inner and outer faces of the ring.

7. The male element according to claim 1, wherein the second part comprises a guiding skirt, which interacts radially with the first part to ensure the radial centering of the second part in relation to the first part.

8. The male element according to claim 7, wherein the guiding skirt comprises the proximal bearing surface provided on a rear end of the guiding skirt.

9. The male element according to claim 1, wherein the mouth surface is the bearing surface of the one of the first or second parts comprising the longitudinal slots.

10. The male element according to claim 1, wherein the longitudinal slots are oblong openings made in the second part and which comprise a distal part and a proximal part, wherein the proximal part of each longitudinal slot has a diameter, at its junction with the radial outer surface of the second part and/or at its junction with the radial inner surface of the second part, which is greater than the diameter of the locking balls, and wherein the or at least one of the inner protrusions and the or at least one of the outer protrusions are formed on the distal part of each longitudinal slot.

11. The male element according to claim 1, wherein the second part comprises a wall that extends axially to the rear from the proximal bearing surface, with the wall capable of being plastically deformed on a shoulder of the first part so as to secure the first and second part axially.

12. The male element according to claim 1, wherein the first part and the second part are connected by welding.

13. The male element according to claim 12, wherein the first part and the second part are connected by laser welding.

14. The male element according claim 1, wherein each longitudinal slot is delimited along the longitudinal axis by a bottom formed by a cylinder part defining an inner diameter and wherein, for each radial housing, the axial distance between the second wall and the bottom of each longitudinal slot is equal to the inner diameter of the bottom cylinder part.

15. A fluid coupling, comprising a male element and a female element adapted to be fitted together in the longitudinal direction, the female element comprising a distal end in which an outer annular slot is provided and a locking ring having a locking face, the locking ring is capable of moving between a locking position in which the locking face is radially aligned with the outer annular slot and holds the locking balls in an inward position and an unlocking position, in which the locking face is offset from the outer annular slot along the longitudinal axis, each ball being free to move to the outer position within the radial housing, in a paired configuration of the male element with the female element, the distal end being received within the annular space of the male element and the locking balls being received within the outer annular slot, wherein the male element is according to claim 1.

16. A method for assembling a male element of a fluidic coupling according to claim 1, wherein the assembly method comprises at least successive steps consisting of:
 a) inserting the locking balls into the longitudinal slots provided in one of the first or second parts of the ring,
 b) engaging the first part with the second part of the ring, with the second wall facing each longitudinal slot along the longitudinal axis, while the inner and outer projections are already present,
 c) bringing the distal bearing surface into contact with the proximal bearing surface along the longitudinal axis,
 d) axially securing the first and second parts of the ring to each other.

17. The method for assembling according to claim 16, wherein in step d), the first and second parts are connected to each other by welding.

18. The method for assembling according to claim 17, wherein in step d), the first and second parts are connected to each other by laser welding.

19. The method for assembling according to claim 16, wherein in step d), the first and second parts are connected to each other by gluing.

* * * * *